(12) United States Patent
Ramakrishnan et al.

(10) Patent No.: US 8,176,984 B2
(45) Date of Patent: *May 15, 2012

(54) SYSTEMS AND METHODS FOR DOWNHOLE SEQUESTRATION OF CARBON DIOXIDE

(75) Inventors: Terizhandur S. Ramakrishnan, Boxborough, MA (US); Romain de Loubens, Cambridge, MA (US); Yusuf Bilgin Altundas, Malden, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 201 days.

This patent is subject to a terminal disclaimer.

(21) Appl. No.: 12/614,829

(22) Filed: Nov. 9, 2009

(65) Prior Publication Data

US 2010/0116511 A1    May 13, 2010

Related U.S. Application Data

(63) Continuation-in-part of application No. 12/167,512, filed on Jul. 3, 2008, now Pat. No. 7,726,402.

(51) Int. Cl.
    *B65G 5/00* (2006.01)
(52) U.S. Cl. ........ 166/305.1; 305/53
(58) Field of Classification Search ...... 166/305.1; 405/53; 518/726
    See application file for complete search history.

(56) References Cited

U.S. PATENT DOCUMENTS

| | | | |
|---|---|---|---|
| 3,330,352 A | 7/1967 | Bernard | |
| 6,412,559 B1 * | 7/2002 | Gunter et al. | 166/271 |
| 7,021,063 B2 | 4/2006 | Viteri | |
| 7,726,402 B2 * | 6/2010 | Ramakrishnan et al. | 166/305.1 |
| 2003/0131582 A1 | 7/2003 | Anderson et al. | |
| 2004/0200618 A1 | 10/2004 | Piekenbrock | |
| 2006/0058402 A1 | 3/2006 | Highgate | |
| 2007/0261844 A1 | 11/2007 | Cogliandro et al. | |

FOREIGN PATENT DOCUMENTS

| EP | 1801346 A1 | 6/2007 |
|---|---|---|
| WO | 2008073765 A2 | 6/2008 |

OTHER PUBLICATIONS

Brooks, R.N., et al., Properties of Porous Media Affecting Fluid Flow, Journal of the Irrigation and Drainage Division, Proceedings of the American Society of Civil Engineers, Jun. 1966, IR 2, pp. 61-88.
Celia, M.A. et al., Geologic Storage of CO2: Leakage Pathways and Environmental Risks, Princeton University and Alberta Geological Survey, May 2000, pp. 1-13.
Ramakrishnan, T.S., et al., Formation producibility and fractional flow curves from radial resistivity variation caused by drilling fluid invasion, Physics of Fluids, American Institute of Physics, Apr. 1997, vol. 9 Issue 4, pp. 833-844.
Ramakrishnan, T. S. and D. J. Wilkinson, "Formation producibility and fractional and fractional flow curves from radial resistivity variation caused by drilling fluid invasion," Phys. Fluids, Apr. 1997, vol. 9(4): pp. 833-844.

* cited by examiner

*Primary Examiner* — William P Neuder

(57) ABSTRACT

Carbon dioxide is sequestered in a formation using dual or multiple completion and injection methods that reduce or eliminates upward leak rates of the sequestered carbon dioxide. The dual or multiple completion and injection method involves the injection of a benign fluid such as brine (water) into a permeable layer of the formation located above the sequestration layer and which is separated form the sequestration layer by a nearly impermeable layer. The water is injected at the same time the carbon dioxide is injected.

22 Claims, 13 Drawing Sheets

SYSTEMS AND METHODS FOR DOWNHOLE SEQUESTRATION OF CARBON DIOXIDE

[This is a continuation-in-part of U.S. Ser. No. 12/167,512 entitled "Methods for Downhole Sequestration of Carbon Dioxide" filed on Jul. 3, 2008.]

BACKGROUND OF THE INVENTION

1. Field of the Invention

This invention relates broadly to carbon dioxide sequestration. More particularly, this invention relates to systems and methods for reducing leakage of sequestered carbon dioxide.

2. State of the Art

Accumulating greenhouse gases have led to the advocation of separating and storing (sequestering) carbon dioxide from its sources. Carbon dioxide sequestration typically entails four distinct steps: the capture of the carbon dioxide from sources such as flue gas, transportation of the carbon dioxide to its ultimate storage site area, compression, pumping and injection of the supercritical carbon dioxide downhole into the formation at a desired location (interval). Central to the success of the sequestration is the integrity of the downhole storage location; i.e., is the location sufficiently bounded by impermeable layers and seals. Because carbon dioxide is buoyant, particular attention is paid to the layer above the injected interval. For sequestration to be successful, any leak from the sequestration site must be inconsequential to inhabitants in the vicinity of the site. This is not exclusive to atmospheric leaks, but also to leaks into potable aquifers.

Generally, it is believed to be desirable to have more than one impermeable boundary between a selected injection (sequestration) zone and a potable aquifer. Thus, for example, assume with respect to FIG. 1 that a preferred injection zone is layer 0. Layer 0 is defined as being between $z=0$ and $z=z_0$ where z is the vertical coordinate. Layer 0 is capped by a nearly impermeable layer 1 whose permeability is substantially smaller than layer 0 (preferably at least three orders of magnitude smaller) and is often in the range of ten or fewer microdarcies. Layer 1 is defined as being between $z=z_0$ and $z=z_1$. Above layer 1 is a permeable stratum, layer 2, which is defined as being between $z=z_1$ and $z=z_2$. Layer 2 in turn is assumed to be overlain by another nearly impermeable shale or shaly sand. With this arrangement, it would be generally assumed that a potable aquifer above layer 2 would be sufficiently protected.

SUMMARY OF THE INVENTION

According to the invention, dual and multiple (e.g., triple) completion and injection methods are provided that reduce or eliminate upward leak rates of sequestered carbon dioxide. The dual and multiple completion and injection methods involve the injection of carbon dioxide into a sequestration layer and the injection of benign fluid such as brine or water into one or more zones of a permeable layer of the formation located above the sequestration layer and separated from the sequestration layer by a nearly impermeable layer (cap-rock). For purposes of this specification and the claims, hereinafter, the term "water" will be used in lieu of "brine" or "benign fluid", as the brine and benign fluid will typically contain water. The water is preferably injected at the same time the supercritical carbon dioxide is injected. Simultaneous injection is preferably accomplished via dual or multiple completions. In the dual completion, the water is injected at a selected pressure. In a multiple completion, water is injected into different zones at different pressures.

According to one aspect of the invention, in a dual completion, the wellbore sections communicating with the adjacent layers of the formation that are to receive the carbon dioxide and the water are provided with their own pressure sensor. The water is injected into its layer at a pressure at least equal to that of the sequestration layer corrected for the gravitational head of the respective fluids.

According to another aspect of the invention, in a dual completion, the water is injected into its layer at a pressure between the pressure which is equal to that of the sequestration layer corrected for the gravitational head of the respective fluids and that value minus the entry capillary pressure of the carbon dioxide into the nearly impermeable cap-rock layer. In a preferred embodiment, the water is injected into its layer at a pressure which is equal to that of the sequestration layer corrected for the gravitational head of the respective fluids minus one-half the entry capillary pressure of the carbon dioxide into the nearly impermeable cap-rock layer.

According to a further aspect of the invention, in a dual completion, only a portion of the zone directly above the cap-rock layer is perforated for injection of water. When only a portion of the zone is perforated, preferably, the portion that is perforated is the portion directly adjacent the nearly impermeable cap-rock layer.

According to yet another aspect of the invention, in a dual completion, the entire zone adjacent the cap-rock layer is perforated for fluid injection. If the fluid is of the same density as the formation fluid, then the entire zone would be uniformly flooded if the formation is homogeneous. Alternatively, perforation may be conducted along at least half of the zone such that the fluid spreads into the entire zone more readily than with a small length of perforation.

According to another aspect of the invention, pressure sensors are provided for both the sequestration layer and the water-injection layer, and a feedback control algorithm is utilized to adjust the injection parameters for the injection of the carbon dioxide and the water into their layers.

According to a further aspect of the invention, in a multiple completion, the permeable zone overlying the cap-rock is perforated for water injection at more than one discrete interval (e.g., two separated intervals) and water is injected at controlled pressures into these intervals.

According to yet a further aspect of the invention, in a multiple completion, when water is to be injected into multiple intervals of the water-injection layer, multiple pressure sensors are provided for the water-injection layer, and a feedback control algorithm is utilized to adjust the injection parameters for the injection of the carbon dioxide into the sequestration layer and the injection of the water at the different intervals of the water-injection layer.

Objects and advantages of the invention will become apparent to those skilled in the art upon reference to the detailed description taken in conjunction with the provided figures.

DETAILED DESCRIPTION OF THE PREFERRED EMBODIMENTS

As previously discussed, it is desirable to sequester carbon dioxide gas in a geological formation. In sequestering the carbon dioxide it is important to reduce the upward leakage rates of $CO_2$ during and after its injection. As set forth in detail hereinafter, a dual completion scheme is provided where water or a benign fluid is injected into an upper stratum above the $CO_2$ injection layer and its cap-rock. By choosing an appropriate injection pressure for water, the vertical pressure gradient (or actually the potential gradient across the cap-rock) could be set to almost zero, at least near the wellbore, and thus reducing leakage rates of $CO_2$. Two-phase flow simulations in a 2D layered geometry show that with such an arrangement, leakage rates could effectively be reduced, and sometimes nearly eliminated. Simulation results show that an ideal site for such carbon dioxide sequestration is one where the water injection layer is characterized by a low value of the product $k\Delta z$, where $k$ is the layer permeability and $\Delta z$ is the thickness of the layer.

Figure 1:
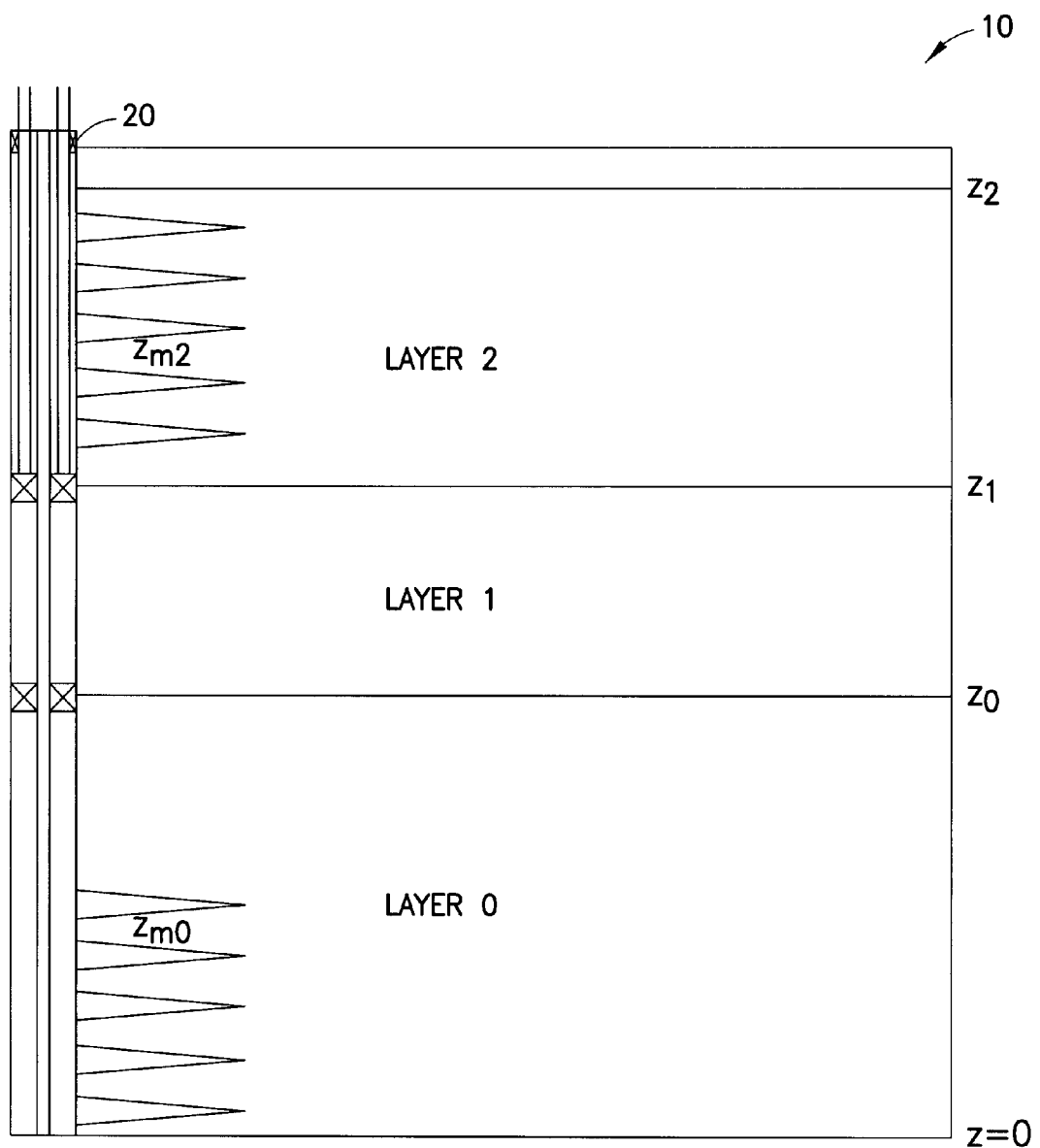
FIG. 1 is a schematic diagram of a sample formation having multiple layers.

Turning now to FIG. 1, a formation 10 traversed by a cased wellbore 20 is posited. Formation 10 includes many layers or zones although only four layers are shown in FIG. 1. As previously mentioned, layer 0 is defined as being between $z=0$ and $z=z_0$ where $z$ is the vertical coordinate. Layer 0 is capped by nearly impermeable layer 1 which is defined as being between $z=z_0$ and $z=z_1$. Above layer 1 is a permeable stratum, layer 2, which is defined as being between $z=z_1$ and $z=z_2$. Layer 2 in turn is assumed to be overlain by another nearly impermeable shale or shaly sand layer 3. For purposes of modeling with a reservoir simulator such as ECLIPSE (a trademark of Schlumberger), GEM (a trademark of Computer Modelling Group), or TOUGH2 (available from Lawrence Berkeley National Laboratory), layer 0 is assumed to be 30 meters thick, layer 1 is assumed to be 10 meters thick, and layer 2 is assumed to be 30 meters thick. The thickness of layer 3 is irrelevant for purposes of analysis. Layer 1 is assumed to have a porosity of 0.05 (dimensionless) and a permeability of 0.01 mD (which is higher than what is typically expected downhole for impermeable zones). Layers 0 and 2 are assumed to have a porosity of 0.2 and a permeability of 100 mD. The radius of wellbore 20 is assigned to be 0.1 m, and the outer radius of the formation 10 is set at 2000 m.

Figure 2:
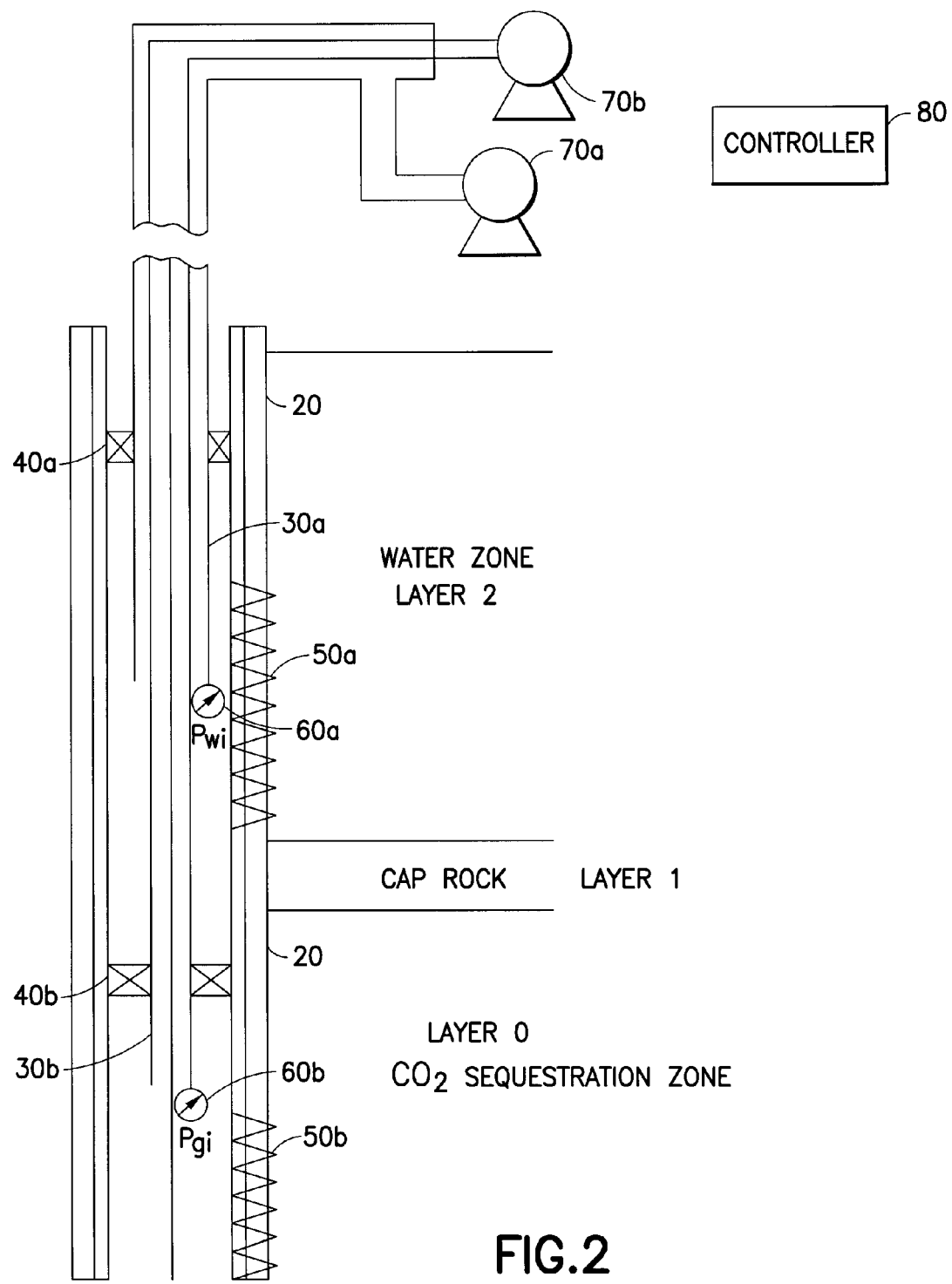
FIG. 2 is a schematic showing a dual-completion well for sequestration of carbon dioxide.

As seen with reference to FIG. 2, the wellbore 20 is assumed to have a dual completion installed. Thus, coaxial tubes 30a, 30b are provided with respective packers 40a, 40b such that tube 30a is in fluid communication with layer 2 of the formation via casing perforations 50a, and tube 30b is in communication with layer 0 of the formation via casing perforations 50b. Pressure sensors 60a, 60b are provided in conjunction with tubes 30a and 30b with the assumption that the measured pressure is at the top of the respective perforations for the purpose of reference datum. Any other datum is equally acceptable, as long as the gravity head correction is applied properly. Supercritical carbon dioxide is injected by suitable means, e.g., pressure controlled pump 70b into layer 0 via tube 30b (displacing brine in that layer). Benign fluid, such as compatible water (e.g. brine) (hereinafter referred to as "water") is injected by suitable means, e.g. pressure controlled pump 70a into layer 2 via tube 30a at a pressure at least equal to that of the pressure of layer 0 corrected for the gravitational head of the respective fluids. The pressure of pumps 70a, 70b is preferably controlled by a controller 80 which receives information from pressure sensors 60a, 60b and which causes the pumps 70a, 70b to pump the supercritical carbon dioxide and water into layers 0 and 2 of the formation as described more completely hereinafter in order to properly sequester the carbon dioxide in layer 0. More particularly, if $z=z_{m0}$ is the pressure measurement point for layer 0, and $z=z_{m2}$ is the pressure measurement point for layer 2, then according to one aspect of the invention, the water injection pressure $p_{wi}$ (measured by sensor 60a) is kept at at least $$p_{wi}=p_{gi}-\rho_g g(z_0-z_{m0})+\rho_w g(z_0-z_{m2})-p_b \qquad (1)$$

where $p_{gi}$ is the carbon dioxide injection pressure (measured by sensor 60b), g is the gravity constant, $\rho_g$ and $\rho_w$ are the densities of the supercritical carbon dioxide and water respectively, and $p_b$ is the entry capillary pressure for the layer of interest as defined hereinafter. It is noted that the second and third terms of the right hand portion of equation (1) provide the difference, i.e., the correction, of the gravitational head of the respective fluids.

According to another aspect of the invention, the water injection pressure may be increased to levels higher than the level of equation (1). More particularly, in one embodiment, the water injection pressure is increased to the gravity head corrected injection pressure of carbon dioxide; i.e., the first three right hand terms of equation (1). In another embodiment, the water injection pressure is increased by a value equal to half the entry capillary pressure of carbon dioxide into layer 1 from equation (1). By increasing the pressure in layer 2 by this amount, carbon dioxide from layer 0 will not penetrate layer 1, as the higher pressure in water provides a safety margin. In a controlled water injection process, the increased value from equation (1) may range from one-quarter to three-quarters the entry capillary pressure of the cap-rock.

By keeping the water pressure at or above the pressure dictated by equation (1), vertical migration of carbon dioxide is suppressed other than purely by diffusion. Diffusion of the carbon dioxide is not of particular concern, however, because the diffusion time scale $T_D$ through layer 1 will typically be thousands of years. More particularly, if the characteristic diffusion constant is D, then the diffusion time equation $T_D$ is $$T_D = \frac{\phi_1 F_1 h_1^2}{D} \qquad (2)$$

where $F_1$ is the formation factor for layer 1, $h_1$ is the layer thickness, and $\phi_1$ is the porosity. For nominal parameter values (e.g. $\phi_1$=0.05, $F_1$=$(1/\phi_1)^2$, D=$10^{-9}$ m$^2$ s$^{-1}$, $h_1$=10 m), the diffusion time $T_D$ will be about 60,000 years and is of little relevance to short and medium term leak mitigation.

In a simulation of two-phase flow, the system of FIG. 1 was utilized. It is assumed that at radial boundary of the formation (assumed to be at 2000 m), quiescent reservoir pressure gradient is maintained. For capillary pressure, drainage and imbibition capillary pressures according to R. H. Brooks and A. T. Corey, "Properties of Porous Media Affecting Fluid Flow", *J. Irrig. Drainage Div.*, 92 (IR2):61-88 (1966), and T. S. Ramakrishnan and D. Wilkinson, "Formation Producibility and Fractional Flow curves from Radial Resistivity Variation Caused by Drilling Fluid Invasion", *Phys. Fluids*, 9(4): 833-844 (1997) are used, with the entry capillary pressure $p_b$ for the layer of interest defined by $$p_b = C\gamma \sqrt{\frac{\phi}{k}} \qquad (3)$$

where $\gamma$ is the interfacial tension between carbon dioxide and water, and C is typically a fraction less than unity (e.g. 0.2). Thus, for layer 1, the porosity ($\phi_1$) and permeability ($k_1$) of layer 1 is utilized in equation (3). As previously mentioned, equation (3) may be utilized for purposes of determining a desired water injection pressure into layer 2. Thus, in accord with one aspect of the invention, the water injection pressure is chosen to be a value equal to the value dictated by equation (1) where $p_b$ is given by equation (3). Most preferably, the water injection pressure is chosen to be the value dictated by equation (1) plus one-half the value dictated by equation (3). According to another aspect of the invention, the water injection pressure may be chosen to be a value between the value dictated by equation (1) and the value given by equation (1) plus one-half the value given by equation (3). According to another aspect of the invention, the water injection pressure may be chosen to be $$p_{wi} = p_{gi} - \rho_g g(z_0 - z_{m0}) + \rho_w g(z_0 - z_{m2}) - \alpha p_b \qquad (4)$$

where $\alpha$ is a number in the range of 0 to 1. Preferably $\alpha$ is between 0.25 and 0.75.

For the purpose of illustrating the feasibility of the invention through reservoir simulation, in terms of fluids, brine is considered displaced through nonwetting supercritical carbon dioxide injection. Injection of carbon dioxide is confined to layer 0. The density of the supercritical carbon dioxide is set at 700 kg/m$^3$ at 15 MPa, with a compressibility and viscosity of 3×10$^{-8}$ Pa$^{-1}$ and 6×10$^{-5}$ Pa-s respectively. The resident brine and the injected water are assigned a density of 1100 kg/m$^3$ and a viscosity of 6×10$^{-4}$ Pa-s. Compressibility effect for the aqueous phase is negligible and is therefore ignored. During injection of carbon dioxide and subsequent counter imbibition, residual saturations (of brine and carbon dioxide respectively) are left behind. For residual water saturation, i.e., the maximum fraction of the pore volume occupied by the trapped wetting phase, a value of 0.075 is assigned. For the maximum residual carbon dioxide saturation, a value of 0.3 is used. Before commencement of injection, the pressure at the top of layer 2 is 13 MPa; i.e., this is the initial reservoir pressure at the top of layers of interest in the illustration. Carbon dioxide injection is assumed to occur through the bottom ten meters of the thirty meter layer 0, at a fixed pressure.

With the formation described above with reference to FIG. 1, and with the formation simulation values as described above, simulations were run for three different scenarios. In a first scenario (Example 0), it was assumed that carbon dioxide was injected into layer 0 without injection of water into layer 2. In a second scenario (Example 1), it was assumed that carbon dioxide was injected into layer 0 and water was simultaneously injected into the bottom two meters of layer 2. In a third scenario (Example 2), it was assumed that carbon dioxide was injected into layer 0 and water was simultaneously injected along the entire length of layer 2.

Figure 3A:
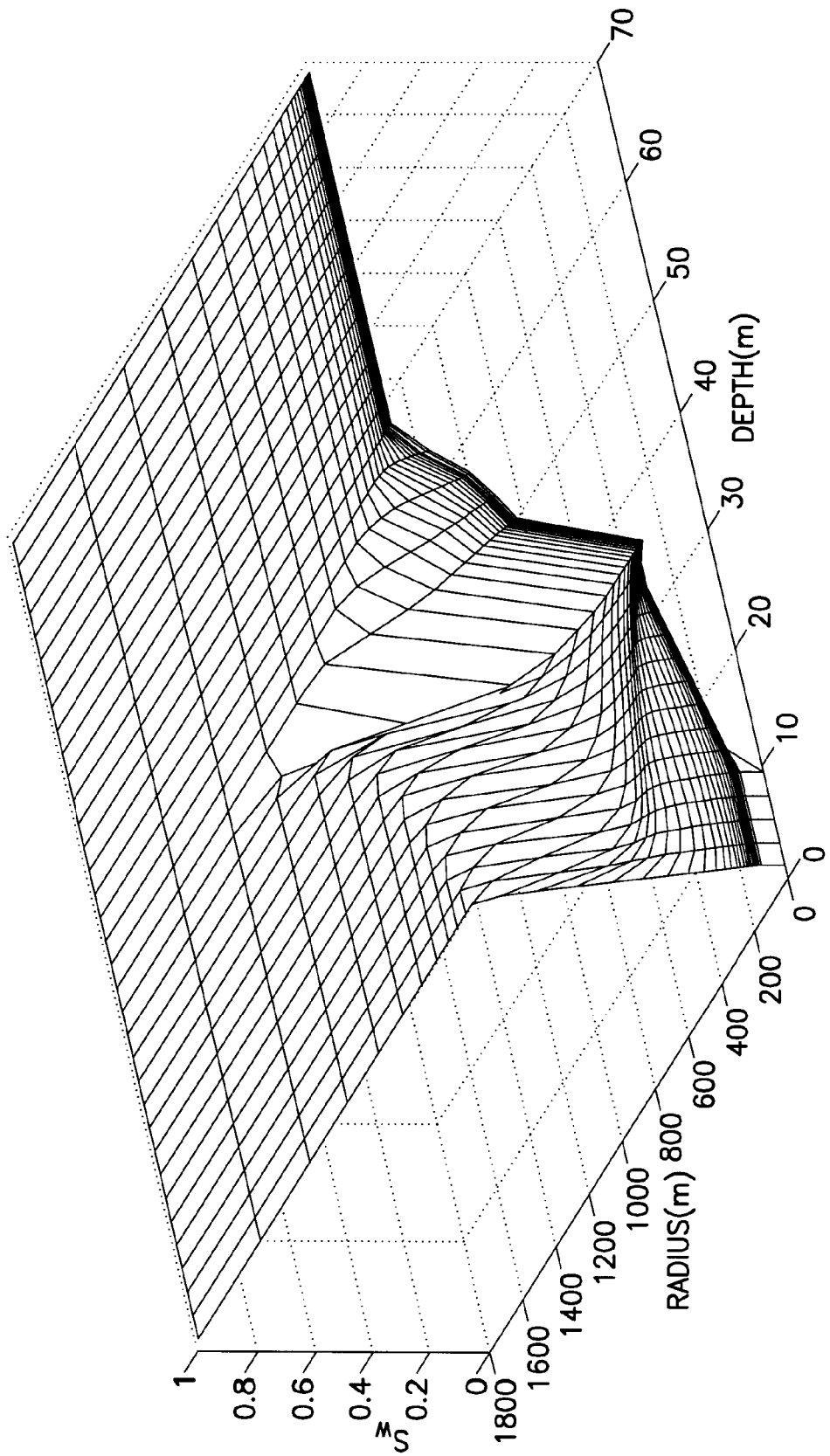
FIG. 3A is a three-dimensional plot generated from a model assuming no injection of water in a permeable zone above the cap-rock of the sequestration zone, and indicating limited migration of carbon dioxide.

More particularly, Example 0 is considered as a baseline for the purpose of characterizing carbon dioxide leakage in the absence of the method of the invention. The model assumes that carbon dioxide injection is carried out at a fixed layer 0 top-perforation pressure of 17 MPa for 730 days. Over the 730 days, 1.137 Tg (1 Tg=10$^6$ metric tons) of carbon dioxide is injected into the formation. FIG. 3A is a plot generated by the model which shows the results of the carbon dioxide injection. As can be seen from FIG. 3A (where depth 0 correlates to the beginning or bottom of layer 0), wherever the water saturation $S_w$ is less than one, carbon dioxide is present. Thus, in layer 0 (0 to 30 meters), the carbon dioxide has migrated such that brine has been at least partially displaced radially over 800 meters. In layer 1 (from 30 to 40 meters), the carbon dioxide has migrated about 400 meters (between about 30 and 32 meters). Although impossible to see in FIG. 3A, the model reveals that carbon dioxide is about to break through into layer 2 in the proximity of the wellbore.

Figure 3B:
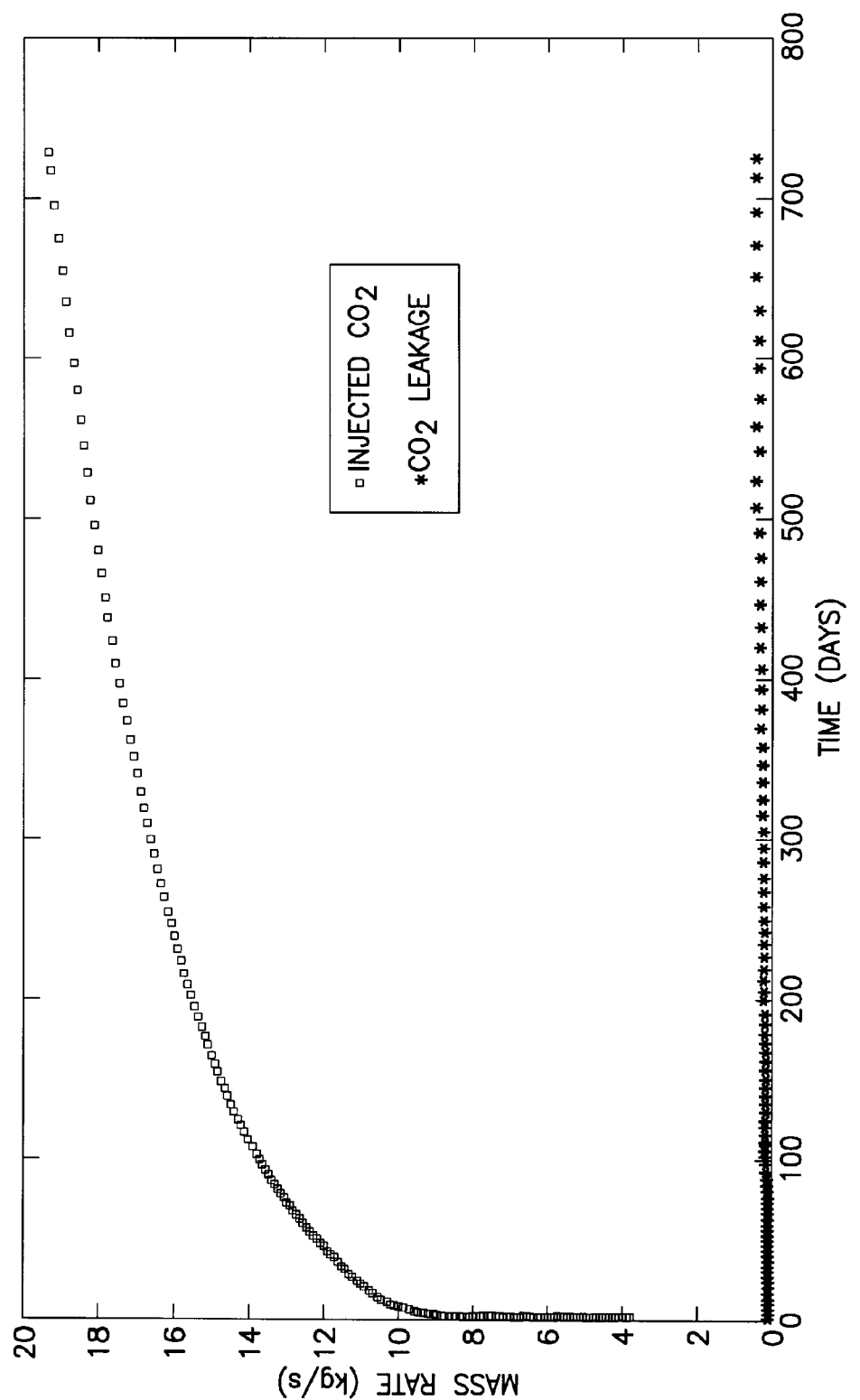
FIG. 3B is a graph showing injection rates of carbon dioxide and leakage of carbon dioxide for the model of FIG. 3A.

FIG. 3B shows the injection rate for carbon dioxide over the 730 days and the carbon dioxide leakage (into layers 1 and 2). While the cumulative leakage amounted to 12.9 Gg, which is only approximately 1.14% of the cumulative injected carbon dioxide, it represents a concern.

Figure 4A:
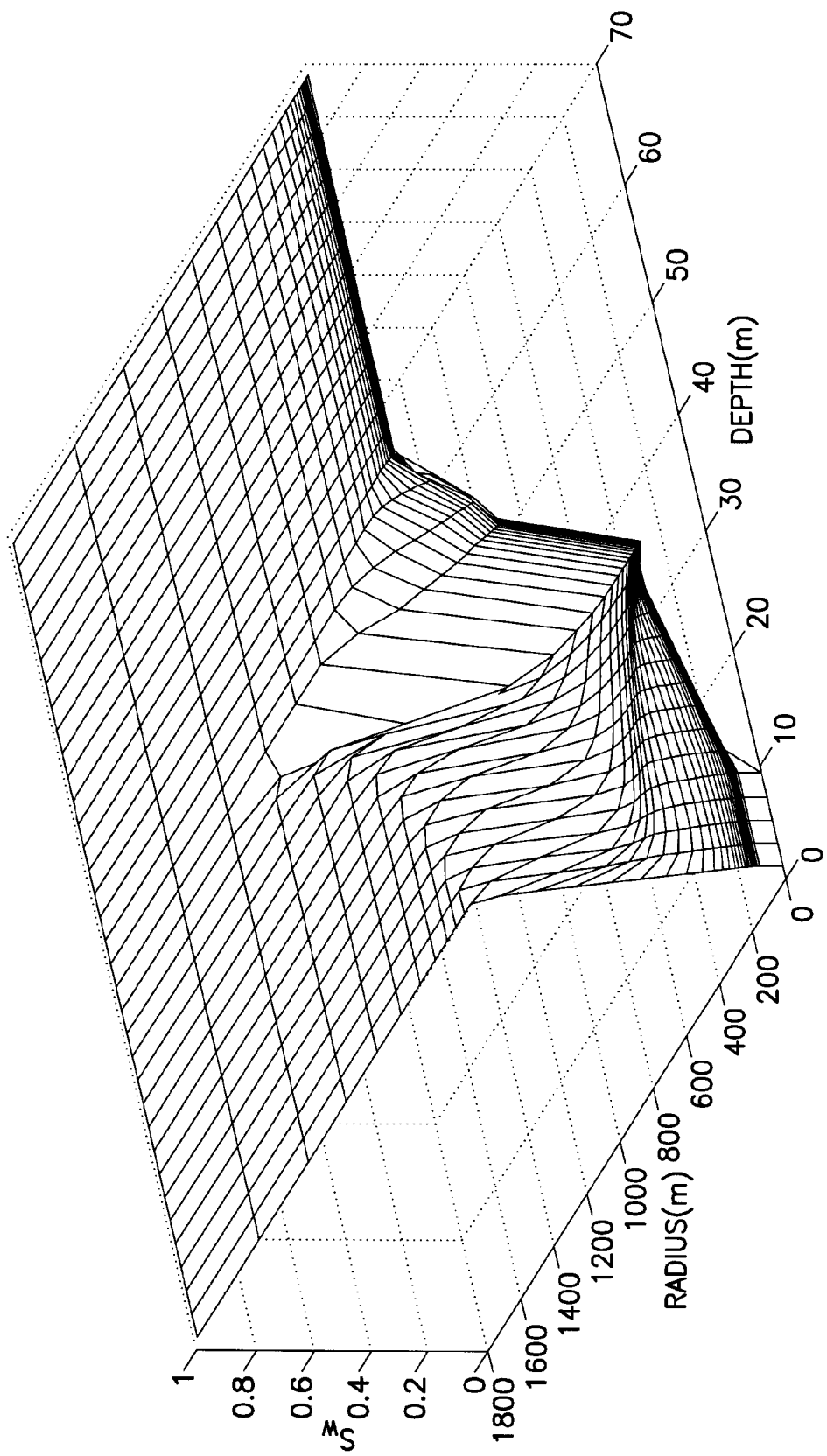
FIG. 4A is a three-dimensional plot generated from a model assuming injection of water in a small portion of a permeable zone above the cap-rock of the sequestration zone, and indicating more limited migration of carbon dioxide.

Example 1 considers the simultaneous injection of water and carbon dioxide. The model assumes that carbon dioxide injection is carried out at a fixed layer 2 top-perforation pressure of 17 MPa for 730 days. Over the 730 days, 1.133 Tg of carbon dioxide is injected (the total being marginally less than Example 1 because of the effects of water injection into layer 2). The model also assumes that the wellbore is perforated at the bottom two meters of layer 2, and the pressure at the top of this perforated interval was specified to be 16.53 MPa (which was above the 15.89 MPa calculated by equation (4) for $\alpha$=1, and slightly above the 16.32 MPa obtained from equation (4) with $\alpha$=½, but below 16.77 MPa with $\alpha$=0; the value used was $\alpha$=¼). FIG. 4A is a plot generated by the model which shows the results of the carbon dioxide injection. As can be seen from FIG. 4A, wherever the water saturation $S_w$ is less than one, carbon dioxide is present. Thus, in layer 0 (0 to 30 meters), the carbon dioxide has migrated such that brine has been at least partially displaced radially over 800 meters. In layer 1 (from 30 to 40 meters), the carbon dioxide has migrated radially about 400 meters (between about 30 and 32 meters). The model reveals that for Example 1, the carbon dioxide has not broken through into layer 2 at all.

Figure 4B:
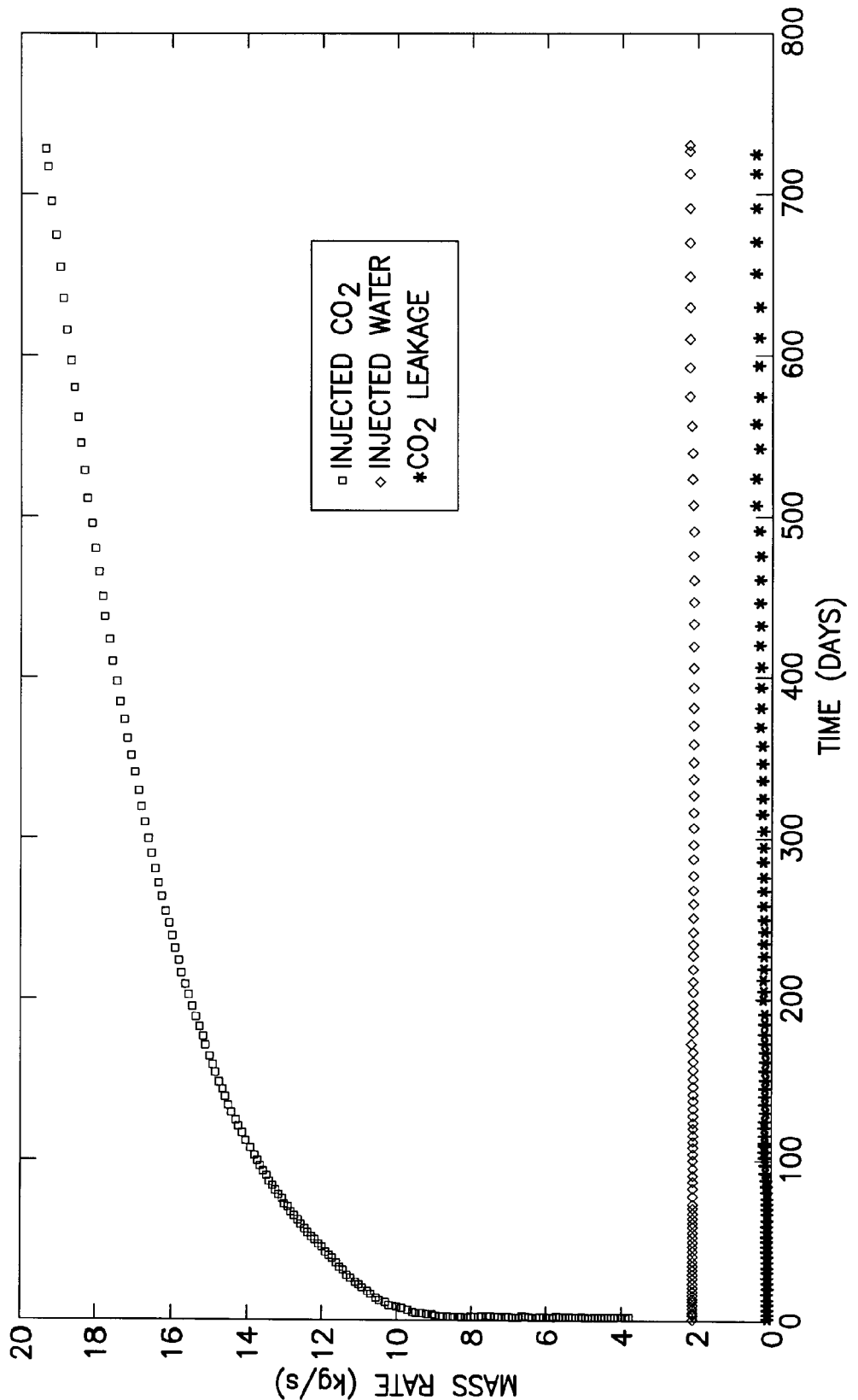
FIG. 4B is a graph showing injection rates of carbon dioxide and water, and leakage of carbon dioxide for the model of FIG. 4A.

FIG. 4B shows the injection rates for carbon dioxide and water for the 730 days and the carbon dioxide leakage (into layer 1) over that period of time. The cumulative leakage amounted to 10.1 Gg, which is approximately 0.9% of the cumulative injected carbon dioxide. This represents an improvement of approximately 25% relative to Example 0 and is therefore useful. However, the 0.9% leakage rate is still not ideal.

Figure 5A:
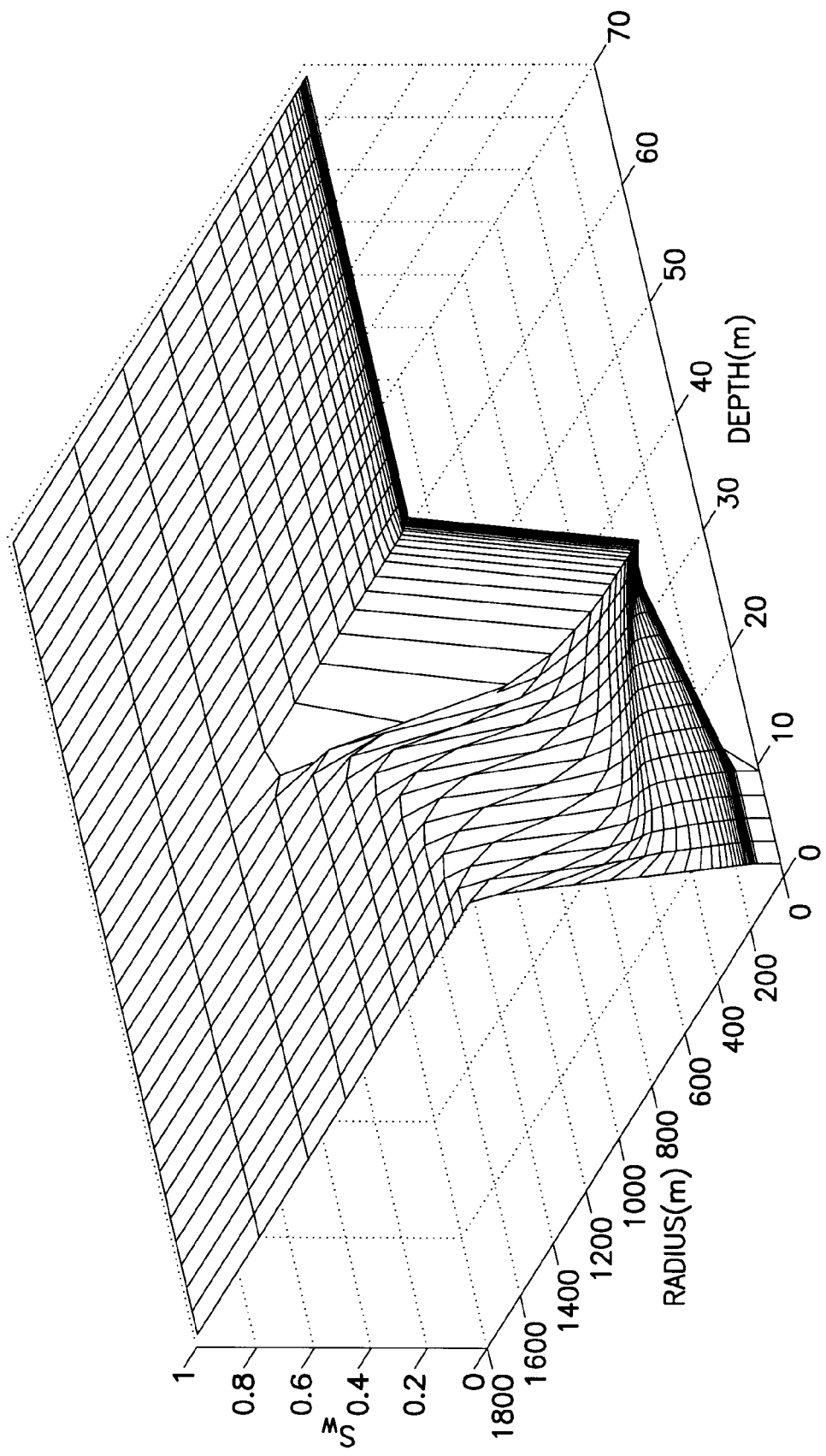
FIG. 5A is a three-dimensional plot generated from a model assuming injection of water in the entire permeable zone above the cap-rock of the sequestration zone, and indicating no migration of carbon dioxide.

Example 2 considers the simultaneous injection of water and carbon dioxide where water is injected over the entire layer 2 interval. The model assumes that carbon dioxide injection is carried out at a fixed top-perforation pressure of 17 MPa for 730 days. Over the 730 days, 1.115 Tg of carbon dioxide is injected. The model also assumes that the wellbore is perforated along all thirty meters of layer 2, and the pressure at the top of this perforated interval was specified to be 16.23 MPa (which is above the 15.59 MPa for $\alpha=1$ calculated by equation (4), and even above the 16.01 MPa obtained from equation (4) with $\alpha=\frac{1}{2}$, but below the 16.44 MPa obtained from equation (4) with $\alpha=0$; the value used was $\alpha \cong \frac{1}{4}$. FIG. 5A is a plot generated by the model which shows the results of the carbon dioxide injection. As can be seen from FIG. 5A, wherever the water saturation $S_w$ is less than one, carbon dioxide is present. Thus, in layer 0 (0 to 30 meters), the carbon dioxide has migrated such that brine has been at least partially displaced radially over 800 meters. However, importantly, the model concludes that there is very little migration of carbon dioxide into layer 1.

Figure 5B:
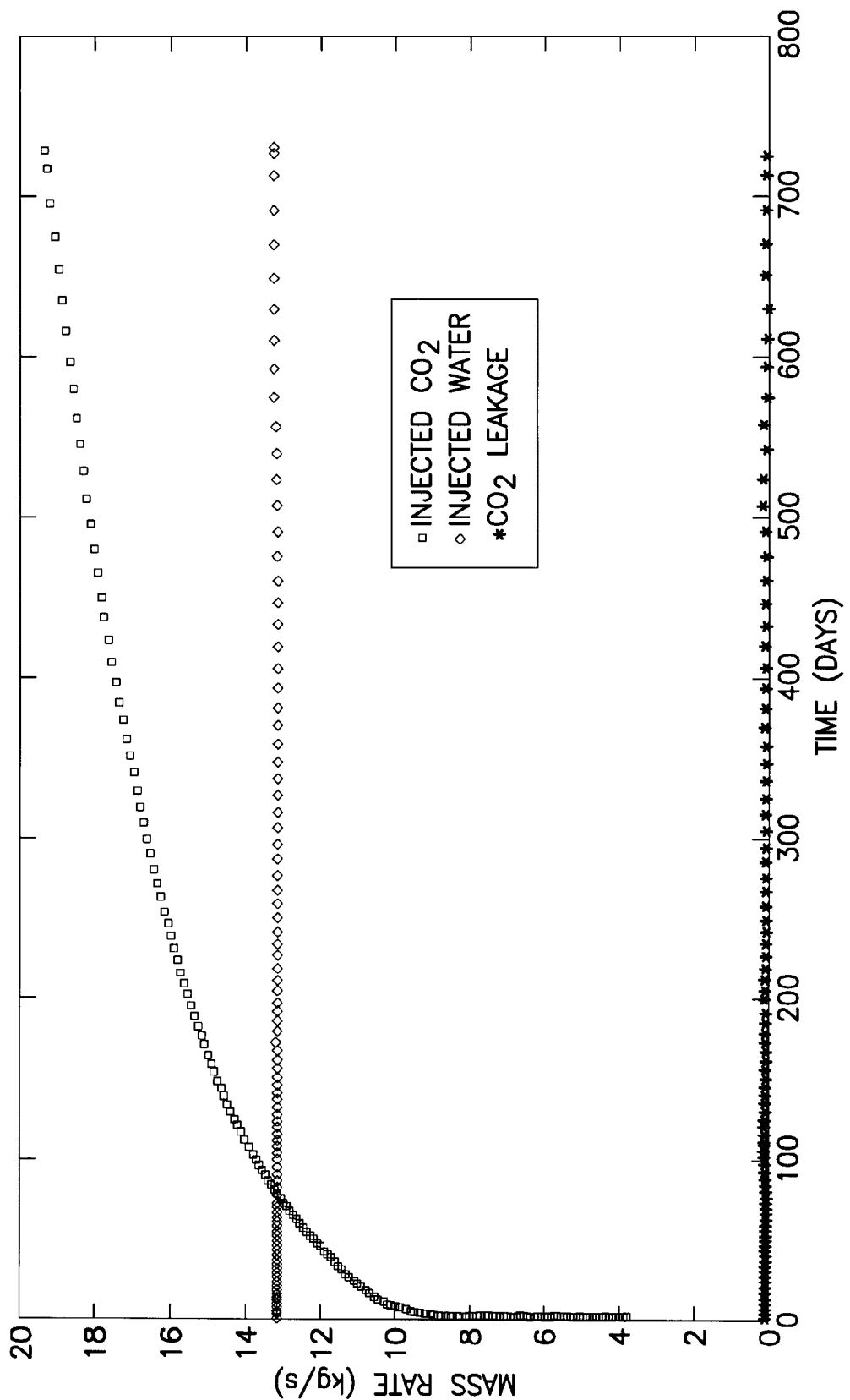
FIG. 5B is a graph showing injection rates of carbon dioxide and water, and leakage of carbon dioxide for the model of FIG. 5A.

FIG. 5B shows the injection rates for carbon dioxide and water for the 730 days and the lack of any leakage of carbon dioxide into layer 1 over that period of time. Thus, the arrangement of Example 2 is superior in sequestering carbon dioxide. A side-by-side comparison of the baseline of Example 0, and Examples 1 and 2 is seen in the following table 1.

TABLE 1

| Example # | Cum. Inj. CO2 (Tg) | Leaked CO2 (Tg) | % | Inj. Water (Tg) | % |
|---|---|---|---|---|---|
| 0 | 1.1367 | 0.01293 | 1.138 | — | — |
| 1 | 1.1329 | 0.01014 | 0.895 | 0.1168 | 10.31 |
| 2 | 1.1153 | 0.00007 | 0.006 | 0.6561 | 58.82 |

It is noted that while the water was injected over a length of thirty meters in Example 2 relative to the two meters in Example 1, the injection rate of the water, and hence the total amount of water injected is approximately six times the injection rate and the total injection amount of Example 1 (compare FIG. 5B to FIG. 4B) is less than the fifteen times one would expect based on length of perforations. This is because water injected into the bottom 2 m spreads over the entire width of layer 2 as it moves radially into the formation.

According to another aspect of the invention, it is possible to simulate different perforation lengths in the water zone less than the maximum length, and compare the total injected water and the total carbon dioxide leakage. Then, it should be possible to find a minimum perforation length where the total carbon dioxide leakage is zero. That perforation length can be considered optimal as using the least water which will totally prevent carbon dioxide leakage. Alternatively, it may be decided that some carbon dioxide leakage is acceptable to save a significant amount of water.

Based on all of the foregoing, one method according to the invention includes: a) choosing a sequestration site for the purpose of carbon dioxide sequestration by finding a permeable layer (e.g., >1 mD) which is overlain by a nearly impermeable layer (e.g., <0.01 mD), which in turn is overlain by a permeable layer; b) completing the well with dual completions and with perforations for the purpose of injecting carbon dioxide into the lower permeable layer and injecting water (brine) or a substantially inert (benign) fluid into the overlaying permeable layer; and c) injecting carbon dioxide and water into their respective layers simultaneously, with the nearly impermeable layer there-between, where the water is injected at a pressure of at least $p_{wi}=p_{gi}-\rho_g g(z_0-z_{m0})+\rho_w g(z_0-z_{m2})-p_b$ and at most $p_{wi}=p_{gi}-\rho_g g(z_0-z_{m0})+\rho_w g(z_0-z_{m2})$.

In order to choose the sequestration site, logs of the formation should be reviewed. The logs can be sonic logs, acoustic logs, nuclear logs, magnetic resonance logs, electromagnetic logs, formation testing logs, or any other log or combination of logs which provides an indication of the depth and location of the layers of the formation and an indication of the permeability of the layers. Formation testing, vertical interference testing, and well tests may be used to confirm the well-log interpretation.

Dual completion of the wellbore may be accomplished according to any desired technique. Likewise, perforation of the wellbore may be accomplished according to any desired technique.

According to one aspect of the invention, the water is injected at a pressure equal or greater than $$p_{wi} = p_{gi} - \rho_g g(z_0 - z_{m0}) + \rho_w g(z_0 - z_{m0}) - C\gamma\sqrt{\frac{\phi_1}{k_1}}$$

where C is between 0.1 and 0.3 and preferably 0.2, and preferably less than $p_{wi}-p_{gi}-\rho_g g(z_0-z_{m0})+\rho_w g(z_0-z_{m2})$.

According to another aspect of the invention, the water is injected at a pressure in the range of $$p_{wi} = (p_{gi} - \rho_g g(z_0 - z_{m0}) + \rho_w g(z_0 - z_{m2})) - (.5 \pm .25)C\gamma\sqrt{\frac{\phi_1}{k_1}},$$

where C is between 0.1 and 0.3, and usually 0.2.

According to a further aspect of the invention, the water is injected into the overlaying permeable layer along a length nearest the impermeable layer.

According to a further aspect of the invention, using information regarding the formation layers, simulations are conducted to find a desired length of the overlaying permeable layer to perforate. The simulations should provide indications of carbon dioxide leakage, if any, from the first permeable layer as a function of the length of the perforation. Preferably, the simulations also provide the amount of water injected into the overlaying permeable layer.

According to another aspect of the invention, carbon dioxide is sequestered in a formation where the first permeable layer is relatively large (e.g., a depth of more than 30 m), and the permeable layer (layer 2) overlaying the non-permeable layer is relatively thin (e.g., a few meters thick) and has a permeability substantially less than the first permeable layer. In this manner, the amount of water which should be injected into layer 2 is reduced as the volume of water expected to be injected scales with the product of the permeability and thickness of layer 2.

According to yet another aspect of the invention, the pressure in both injection intervals is measured downhole.

According to yet a further aspect of the invention, multiple (e.g., two) independent (i.e., spaced) completions are provided into the water-injection layer of the formation above the cap-rock, and a set of sensors are provided along the wellbore.

According to even another aspect of the invention, a feedback control system and algorithm are provided to set and/or maintain the injection pressures in the respective completions, including the carbon dioxide completion and the one or more water completions.

According to yet another aspect of the invention, the completion locations for water injection are chosen so that the water flow potential is within a specified tolerance of the $CO_2$ potential for as large a radial distance as possible at a reference depth in order to mitigate carbon dioxide leakage.

Figure 6:
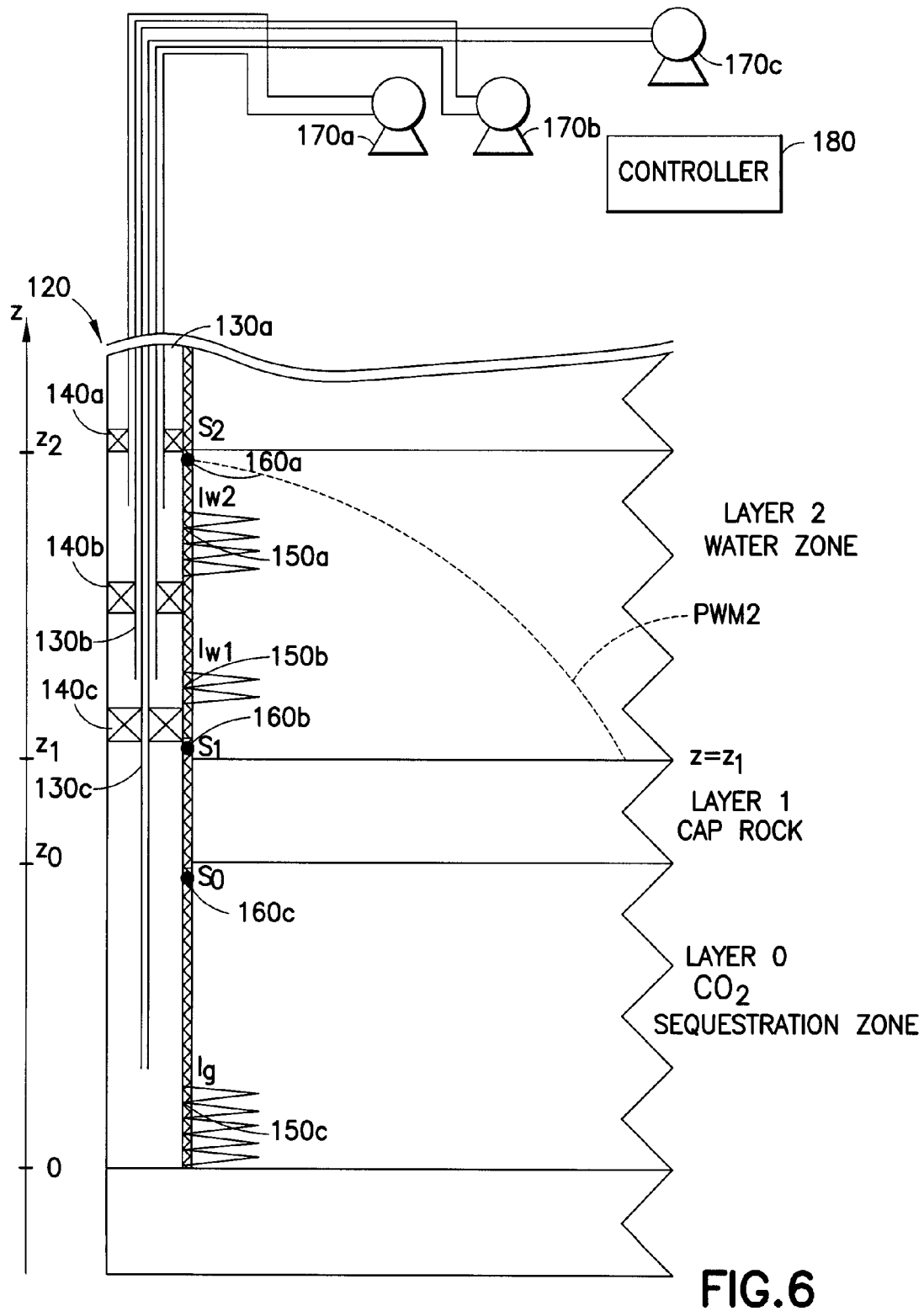
FIG. 6 is a schematic showing a triple-completion well for sequestration of carbon dioxide which includes a dual injection of water into a formation layer.

The concept of simultaneously controlled injection with multiple independent completions provided in the water-injection layer is illustrated in FIG. 6, where the vertical axis z is pointing upwards. The formation of FIG. 6 is exactly the same as the formation of FIGS. 1 and 2 with the preferred injection zone for $CO_2$ (layer 0) capped by a nearly impermeable shale or shaly sand (layer 1), above which is another permeable stratum (layer 2) also overlain by a cap-rock. The tops of layers 0, 1 and 2 are defined by the vertical coordinates $z_0$, $z_1$ and $z_2$, respectively. The difference between the completion of FIG. 6 and the completion of FIG. 1 is that FIG. 6 shows a triple completion installed in wellbore 120 while FIG. 1 shows a dual completion installed in wellbore 20. Thus, in FIG. 6 coaxial tubes 130a, 130b, 130c are provided with respective packers 140a, 140b, 140c such that tube 130a is in fluid communication with a first portion of layer 2 of the formation via casing perforations 150a, and tube 130b is in communication with a second portion of layer 2 of the formation via casing perforations 150b which are spaced from casing perforations 150a. Tube 130c is in fluid communication with layer 0 of the formation via casing perforations 150c. Pressure sensors 160a, 160b, 160c are located such that they are in contact with the formation fluid and are preferably associated with the formation intervals communicating with tubes 130a and 130b, 130c respectively as discussed hereinafter. Carbon dioxide is injected by suitable means, e.g., pressure controlled pump 170c into layer 0 via tube 130c (displacing brine in that layer). Water is injected by suitable means, e.g., pressure controlled pump 170a and pressure controlled pump 170b, into layer 2 via tube 130b and 130a at controlled pressures. The pumping pressures of pumps 170a, 170b and 170c are preferably controlled by a controller 180 which receives information from pressure sensors 160a, 160b, 160c and which causes the pumps 170a, 170b, 170c to pump the carbon dioxide and water into layers 0 and 2 of the formation as described more completely hereinafter in order to properly sequester the carbon dioxide in layer 0.

It is assumed that that each injection interval $I_g$, $I_{w1}$, $I_{w2}$ has its own pressure gauge attached to the bottom of the tubes 130a, 130b, 130c, and the tubes are in turn are associated with the pumps 170a-170c. These pressures will be referred to as $p_{gi}$, $p_{wi1}$ and $p_{wi2}$, respectively. The three pressure probes or sensors 160a, 160b, and 160c provide additional measurement points as they are located away from the perforations. Sensor 160c is preferably located directly below the layer 1 at the top of layer 0, sensor 160b is preferably located directly above the cap-rock at the bottom of layer 2, and sensor 160a is preferably located near the top of layer 2. Sensor 160a is placed as far away from the perforations as possible (i.e., at the top of layer 2) in an attempt to obtain the deepest possible depth of investigation, although such a result is not guaranteed. A case in point is when the ratio $p_{wi2}/p_{wi1}$ is sufficiently large for water from $I_{w2}$ to force itself into $I_{w1}$ via the formation because of a large pressure drive. Indeed, the depth of investigation depends upon the ratio of potentials (gravity-corrected pressures) in $I_{w1}$ and $I_{w2}$. This may be understood by writing the single phase potential equations for layer 2 whose boundary and initial conditions are homogeneous except for the injection potentials. The isopotential contour shapes depend only on the ratio, although the potential values depend on the magnitude of the injection potentials.

In the arrangement of FIG. 6, it is desirable for the water pressure measured at sensor 160b to be controlled so that the vertical pressure gradient near the wellbore is equal to zero. Thus, the pressures of injection of gas and water into zones $I_g$ and $I_{w1}$ are controlled such that the pressures measured at sensors 160c and 160b are kept nearly the same except for corrections due to capillary pressure and gravity head as explained above with respect to the dual-completion embodiment. Pressures measured at sensors 160c, 160b, and 160a are referred to as $p_{gm0}$, $p_{wm1}$, and $p_{wm2}$ respectively, with their locations being $z_{m0}$, $z_{m1}$, and $z_{m2}$.

Conceptually, the primary role of the pressure sensor 160a is to control the vertical pressure gradient in the formation at a radial distance from the wellbore. This is accomplished by recognizing r*, the radial coordinate of the intersection between the isobar $p=p_{wm2}$, corrected for gravity (isopotential) and the horizontal line $z=z_1$ which is shown schematically in FIG. 6. Situations when such an isopotential does not exist are avoided, because r* defines the radius of investigation of sensor 160a at $z=z_1$, and it is desirable to make this distance sufficiently large. Although the value of r* is generally unknown it can be estimated from a single-phase flow simulation in layer 2, and tabulated for a range of control parameters of interest in $I_w$. Since layer 2 is in single phase flow, as mentioned before, isopotential contours within a scale factor depend on the ratio of the potentials at $I_{w1}$ and $I_{w2}$; thus a tabulation of r* with respect to the potential ratio at $I_{w1}$ and $I_{w2}$ may be obtained.

According to one aspect of the invention, a sufficient amount of water from $I_w$ is injected and/or the injection pressure of the $CO_2$ is reduced sufficiently so that the water pressure at sensor 160a matches a representative $CO_2$ pressure at the radius of investigation r* below the cap-rock. This pressure can be expressed as $p^*_{gm0} = p_{gm0} - \Delta p^*_g$, where $\Delta p^*_g$ is a characteristic radial pressure drop in the $CO_2$ phase between the measurement point at sensor 160c and the radius of investigation r*, usually at $z=z_0$. Gravity corrections to this assumption are incorporated in the more complete analysis shown below.

In general, the value of $\Delta p^*_g$ can be directly predicted from a numerical simulation accounting for the pressure and injection history. A simpler approach is to approximate it by $$\Delta p^*_g = \beta \frac{q_g}{\lambda_{g0}} \tag{5}$$

where β is a geometric factor that depends on r*, which is obtained from independent layer 2 simulations, $q_g$ is the volumetric injection rate of $CO_2$, and $\lambda_{g0}$ is the end point mobility value of $CO_2$. The end point mobility is defined as $\lambda_{g0}=k_0 k_{rg0}/\mu_g$ where $k_0$ is the rock permeability in layer 0 (or a homogenized value), $k_{rg0}$ is the relative permeability of $CO_2$ evaluated at the residual water saturation, and $\mu_g$ is the $CO_2$ viscosity at reservoir conditions. In the case of a 2D axisymmetric geometry with horizontal layers, as depicted in FIG. 6, the coefficient β can be expressed as $$\beta = \beta_0 \frac{\ln(r^*/r_w)}{2\pi h_0} \tag{6}$$

where $h_0$ is the thickness of layer 0, $r_w$ is the wellbore radius and $\beta_0$ is expected to be a nearly constant shape factor. Since equation (6) cannot be used for complex reservoir models, β must generally be estimated through numerical simulation and tabulated for different values of r*. Thus for the geometry of FIG. 6, it would be desirable to first estimate r* from layer 2 simulations, then carry out simulations in layer 0 for the expected range of $q_g$, and infer $\beta_0$ from equations (5) and (6). The target pressure condition for sensor 160b corrected for gravity head and capillary pressure is $$p_{wm1}^s = p_{gm0} - \rho_g g(z_0 - z_{m0}) + \rho_w g(z_0 - z_{m1}) - (1-\alpha_1)p_b \tag{7}$$

where s in the superscript denotes the set point, i.e., the desired value or target condition, and $p_b$ is the capillary pressure. In the simplest of circumstances, the location of sensor 160b will coincide with the perforations, in which case the injection pressure will be kept at $p^s_{wm1}$. Similarly, for the measurement point of sensor 160*a*, the set point is given by $$p_{wm2}{}^s - p^*{}_{gm0} - \rho_g g(z_0 - z_{m0}) + \rho_w g(z_0 - z_{m2}) - (1-\alpha_2)p_b \qquad (8)$$

Note that the position r* for evaluating $p^*_{gm0}$ is determined by an isopotential contour from $(r_w, z_{m2})$ to $(r^*, z_1)$. The α values are safety factors introduced through the entry capillary pressure for $CO_2$ and are less than unity but greater than zero. For the far field, the α values are usually chosen to be between 0.25 and 0.75 and for the near field, higher values (e.g. between 0.75 and 1) might be utilized.

The well control parameters in $I_g$ and $I_w$ are determined by a feedback control algorithm based on the target conditions (7) and (8). In practice, the injection flow rates or pressures are adjusted (in real time—whether on a minute by minute, hour by hour, day by day basis, etc.) through a control valve or a controllable pumping system (e.g., pumps 170*a*, 170*b*, 170*c* and controller 180). When the completions are pressure controlled, the feedback control algorithm for the water injection pressures can be formally written as:

$$\frac{dp_{wi1}}{dt} = [\kappa_{11}|p^s_{wm1} - p_{wm1}|^{\upsilon_{w11}} \text{sgn}(p^s_{wm1} - p_{wm1}) + \qquad (9)$$
$$\kappa_{12}|p^s_{wm2} - p_{wm2}|^{\upsilon_{w12}} \text{sgn}(p^s_{wm2} - p_{wm2})]$$
$$[1 - H(p_{wi1} - p^M_{wi1})H(A_1)]$$

where $A_1 = [\kappa_{11}|p^s_{wm1} - p_{wm1}|^{\upsilon_{w11}} \text{sgn}(p^s_{wm1} - p_{wm1}) + \qquad (10)$
$$\kappa_{12}|p^s_{wm2} - p_{wm2}|^{\upsilon_{w12}} \text{sgn}(p^s_{wm2} - p_{wm2})]$$

and where the constants K denote nonnegative control coefficients discussed below, the constants υ are sensitivity exponents, which for water injection is typically set to equal 1 and is discussed below, sgn is a sign function which is 1 for x>0, and is −1 for x<0, H is a function where H(x)=1 when x≧0, and zero otherwise, and superscript M denotes a maximum (injection pressure); and $$\frac{dp_{wi2}}{dt} = [\kappa_{21}|p^s_{wm1} - p_{wm1}|^{\upsilon_{w21}} \text{sgn}(p^s_{wm1} - p_{wm1}) + \qquad (11)$$
$$\kappa_{22}|p^s_{wm2} - p_{wm2}|^{\upsilon_{w22}} \text{sgn}(p^s_{wm2} - p_{wm2})]$$
$$[1 - H(p_{wi2} - p^M_{wi2})H(A_2)]$$

where $A_2 = [\kappa_{21}|p^s_{wm1} - p_{wm1}|^{\upsilon_{w21}} \text{sgn}(p^s_{wm1} - p_{wm1}) + \qquad (12)$
$$\kappa_{22}|p^s_{wm2} - p_{wm2}|^{\upsilon_{w22}} \text{sgn}(p^s_{wm2} - p_{wm2})]$$

The changes in water pressure at the water injection intervals over time as set forth in equations (9)-(12) imply that the wellbore water injection pressures are increased until the maximum allowed pressure limit denoted by superscript M is reached, after which it is possible only to decrease the pressure. The nonnegative control coefficients κ used in equations (9)-(12) can be determined by optimising for the response behavior. The sensitivity exponents υ used in equations (9)-(12) for the water injection pressures are usually unity so that the controller takes action proportional to the deviation from the desired value.

In a similar manner, the control equation for the $CO_2$ injection pressure can be set forth as:

$$\frac{dp_{gi}}{dt} = \qquad (13)$$
$$\kappa_{g0}|p^M_{gi} - p_{gi}|^{\upsilon_{g0}} \text{sgn}(p^M_{gi} - p_{gi})H(p^{M_\varepsilon}_{wi2} - p_{wi2})H(p^{M_\varepsilon}_{wi1} - p_{wi1}) - [$$
$$\kappa_{g1}|p_{wm1} - p^s_{wm1}|^{\upsilon_{g1}} H(p^s_{wm1} - p_{wm1}) + \kappa_{g2}|p^s_{wm2} - p_{wm2}|^{\upsilon_{g2}}$$
$$H(p^s_{wm2} - p_{wm2})] \times [1 - H(p^{M_\varepsilon}_{wi2} - p_{wi2})H(p^{M_\varepsilon}_{wi1} - p_{wi1})]$$

The maximum values for gas injection and water injection are expected to have a safety margin built in and should be sufficiently smaller than the fracture pressure or the allowable injection pressure. A numerical algorithm may overshoot the maximum values, and therefore there is a need for a safety margin which is preferably provided in the design of the overall system. It is also a prudent practice to set a hard upper limit in the control algorithm for $p_{gi}$ and $p_{wi}$. In addition, for the gas injection the sensitivity coefficients $\upsilon_{g1}$ and $\upsilon_{g2}$ may be set to zero. When these are set to zero, pursuant to equation (13), a fixed rate of $CO_2$ injection pressure decline may be imposed when either of the water injection pressure limits are exceeded. Values of υ larger than unity make the control action sluggish when the gas injection pressure is close to the desired (set) value and large away from it. The superscript $M_\epsilon$ reflects that the values are slightly lower than the maximum allowed injection pressures denoted in equations (9) and (11) by the superscript M.

The formalism of the control system does not prevent large potential ratios between $I_{w1}$ and $I_{w2}$. Under such circumstances, it is quite possible for one or the other to become a production interval. It is then possible for an isopotential curve from sensor 160*a* to not intersect $z=z_1$ such that an inference of deep pressure from the wellbore is not possible. It is preferable to avoid this situation.

According to one aspect of the invention, it is therefore desirable to include some safety checks in the control algorithm. For example, maximum and minimum ratios between the two water injection pressures may be specified in order to avoid water production (i.e., water from one zone forcing itself into another zone via the formation). These threshold ratios are preferentially imposed on the ratio of the water flow potentials and can be determined precisely from single-phase flow simulations. According to another aspect of the invention, any variant of equations (9), (11), and (13) can be utilized; e.g. using higher order derivatives. Similar control algorithms and safety checks can also be implemented when the injection intervals are flow rate controlled.

According to another aspect of the invention, it is conceivable that under some circumstances it might prove to be advantageous to have a single set of perforations for the water injection interval (i.e., a dual completion instead of a triple completion). Referring to FIG. 1 (or FIG. 6), through modelling studies a determination may be made as to how a measured pressure for the water interval is to be defined. For example, the water interval measured pressure $p_{wm}$ may be defined according to $$p_{wm} = \xi p_{wm1} + (1-\xi)p_{wm2}, \quad 0 \leq \xi \leq 1 \qquad (14)$$

If desired, ξ can be made to be a function of time so that the weighting shifts from one measured pressure at an earlier time to another at a later time. The same weighting is applied to the set point $p_{wm}{}^s$. The injection pressure is denoted to be $p_{wi}$. The control algorithm for the water injection pressure is then $$\frac{dp_{wi}}{dt} = \qquad (15)$$
$$\kappa_w |p^s_{wm} - p_{wm}|^{\upsilon_w} \text{sgn}(p^s_{wm} - p_{wm})[1 - H(p_{wi} - p^M_{wi})H(p^s_{wm} - p_{wm})]$$

while the control algorithm for the gas injection pressure is $$\frac{dp_{gi}}{dt} = \kappa_{g0}|p^M_{gi} - p_{gi}|^{\upsilon_{g0}} \text{sgn}(p^M_{gi} - p_{gi})H(p^{M_\varepsilon}_{wi} - p_{wi}) - \qquad (16)$$
$$[\kappa_{g1}|p_{wm} - p^s_{wm}|^{\upsilon_{g1}} H(p^s_{wm} - p_{wm})] \times [1 - H(p^{M_\varepsilon}_{wi} - p_{wi})]$$

The controlled injection aspect of the invention was evaluated using numerical simulation of two-phase flow. In the following discussion, Examples 0, 1 and 2 refer to the three scenarios presented above (Example 0 being the baseline, Example 1 representing simultaneous injection of water and carbon dioxide with water injected into the bottom two meters of layer 2, and Example 2 representing simultaneous injection of water and carbon dioxide with water injected along the entire length of layer 2) while Example 3 is based on the controlled injection of carbon dioxide and water using the control equations and with water injected along two separate intervals of layer 2. For all of these examples, the reservoir geometry and the petrophysical properties are the same. The formation layers are $z_0=30$ m, $z_1=40$ m, $z_2=70$ m. Layers 0 and 2 have a porosity of 0.2 and a permeability of 100 mD, while the intervening layer 1 is characterized by a porosity of 0.05 and a permeability of 0.01 mD. The wellbore radius is equal to 0.1 m and the outer radius of the formation is at 2000 m. At this radial boundary, static reservoir pressure gradient is maintained. For all cases, $CO_2$ is injected from the bottom 10 m of layer 0.

As suggested above, in Example 3, unlike Examples 0, 1, and 2, water is injected via two independent sets of perforations $I_{w1}$ and $I_{w2}$, corresponding to 41.5 m$\leq$z$\leq$44 m and 45 m$\leq$z$\leq$60 m, respectively. The maximum injection pressure (usually dictated by the fracture initiation pressure, as defined in geomechanics) was set to 17 Mpa at $z=z_2$, and then corrected for gravity at the top of $I_{w1}$ and $I_{w2}$, yielding the maximum water injection pressures $p_{wi1}{}^M=17.28$ MPa and $p_{wi2}{}^M=17.11$ MPa. For $CO_2$, the maximum (target) injection pressure is $p_{gi}{}^M=17$ MPa.

The feedback control algorithm is based on the pressure values read by sensors 160a, 160b, 160c shown in FIG. 6 where sensors 160c and 160b are placed just below and just above the cap-rock while sensor 160a is at the top of layer 2. It was determined from a single-phase flow simulation in layer 2 that the depth of investigation of sensor 160a for typical water injection rates of 1 kg/s for $I_{w1}$ and 9 kg/s for $I_{w2}$ was approximately 15 m. Therefore r* was set to equal 15 m as a constant representative value. In addition, a two-phase flow simulation in layer 0 indicated that a reasonable value for the geometric shape factor was given by $\beta_0=0.1$. The capillary pressure safety margin was set to $\alpha_1=0.95$ for the near-wellbore set point (equation (7)) and $\alpha_2=0.5$ for the deep radius set point (equation (8)). The larger value of $\alpha_1$ results in a higher safety margin for $CO_2$ intrusion into layer 1, but a lower margin for water leak into layer 0. This results in a good leak control across layer 1. All of the control parameters used for this simulation are listed in Table 2. The $\upsilon$ coefficients were kept equal to one.

TABLE 2

Table of control parameters (all expressed in s$^{-1}$) used in Example 3.

| $\kappa_{11}$ | $\kappa_{12}$ | $\kappa_{22}$ | $\kappa_{21}$ | $\kappa_{g0}$ | $\kappa_{g1}$ | $\kappa_{g2}$ |
|---|---|---|---|---|---|---|
| $1 \times 10^{-6}$ | $5 \times 10^{-7}$ | $8 \times 10^{-7}$ | 0 | $5 \times 10^{-7}$ | 0 | $2 \times 10^{-8}$ |

Figure 7:
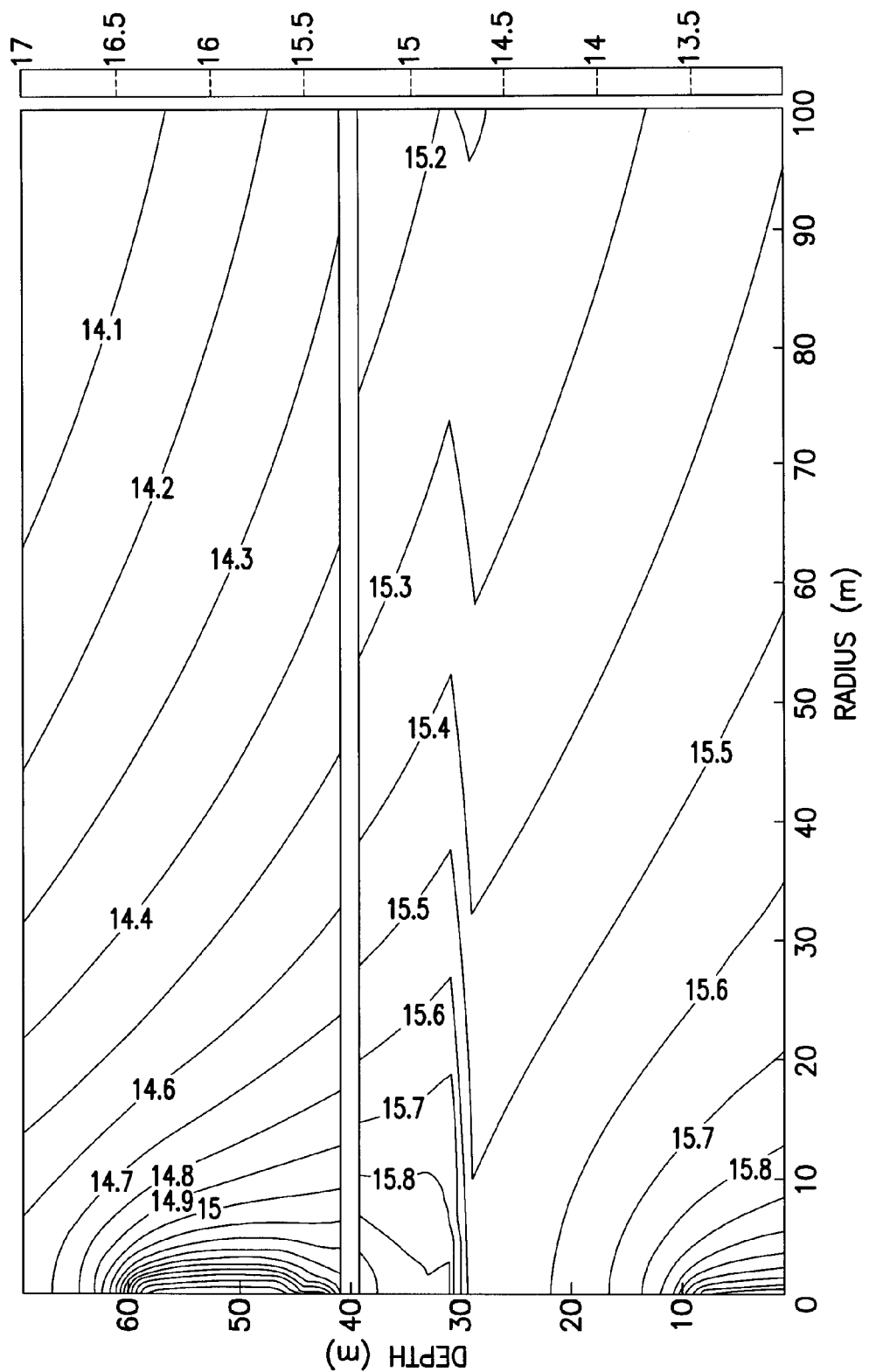
FIG. 7 is a pressure contour map generated by a model of a triple-completion system using a feedback control algorithm and indicating the pressure distribution in the formation at the end of a period of injection.

FIG. 7 shows the pressure distribution for the simulation of Example 3. The displayed pressure values are the $CO_2$ pressures where $CO_2$ is present. Otherwise the displayed pressure is the water pressure plus the entry pressure for $CO_2$ at that location. The isobar values above and below the cap-rock indicate that penetration of the $CO_2$ into the cap rock is mitigated, and the penetration of water into the $CO_2$ zone is also avoided at least for a distance of 10 m.

For the purpose of comparison, the amounts of injected $CO_2$ in Examples 2 and 3 have been made nearly the same. In the case of Example 3, $CO_2$ was injected over a period of 755 days, instead of 730 days for Example 2. This slightly longer injection time was necessitated because $p_{gi}{}^M$ was set to 17 MPa. Unlike Example 2, this meant that $p_{gi}$ was below the maximum allowed value for some time intervals as dictated by the control algorithm and as discussed below. As summarized below in Table 3 (which is expanded from Table 1 to show Example 3), Example 3 yields a substantially smaller cumulative $CO_2$ leakage, by a factor of almost 20 relative to Example 2. On an absolute scale, the amount of water injected is also reduced (by 0.0117 Tg), with a 2% improvement in terms of the injected $CO_2$ mass fraction. Thus, the use of two separate water injection intervals and a control algorithm is shown to provide improved results.

TABLE 3

| Example # | Cum. Inj. $CO_2$, Tg | Leaked $CO_2$, Tg | % | Inj. Water, Tg | % |
|---|---|---|---|---|---|
| 0 | 1.1367 | 0.01293 | 1.138 | — | — |
| 1 | 1.1329 | 0.01014 | 0.895 | 0.1168 | 10.31 |
| 2 | 1.1153 | $7.2 \times 10^{-5}$ | $6.4 \times 10^{-3}$ | 0.6561 | 58.82 |
| 3 | 1.1156 | $3.7 \times 10^{-6}$ | $3.3 \times 10^{-4}$ | 0.6344 | 56.86 |

Figure 8:
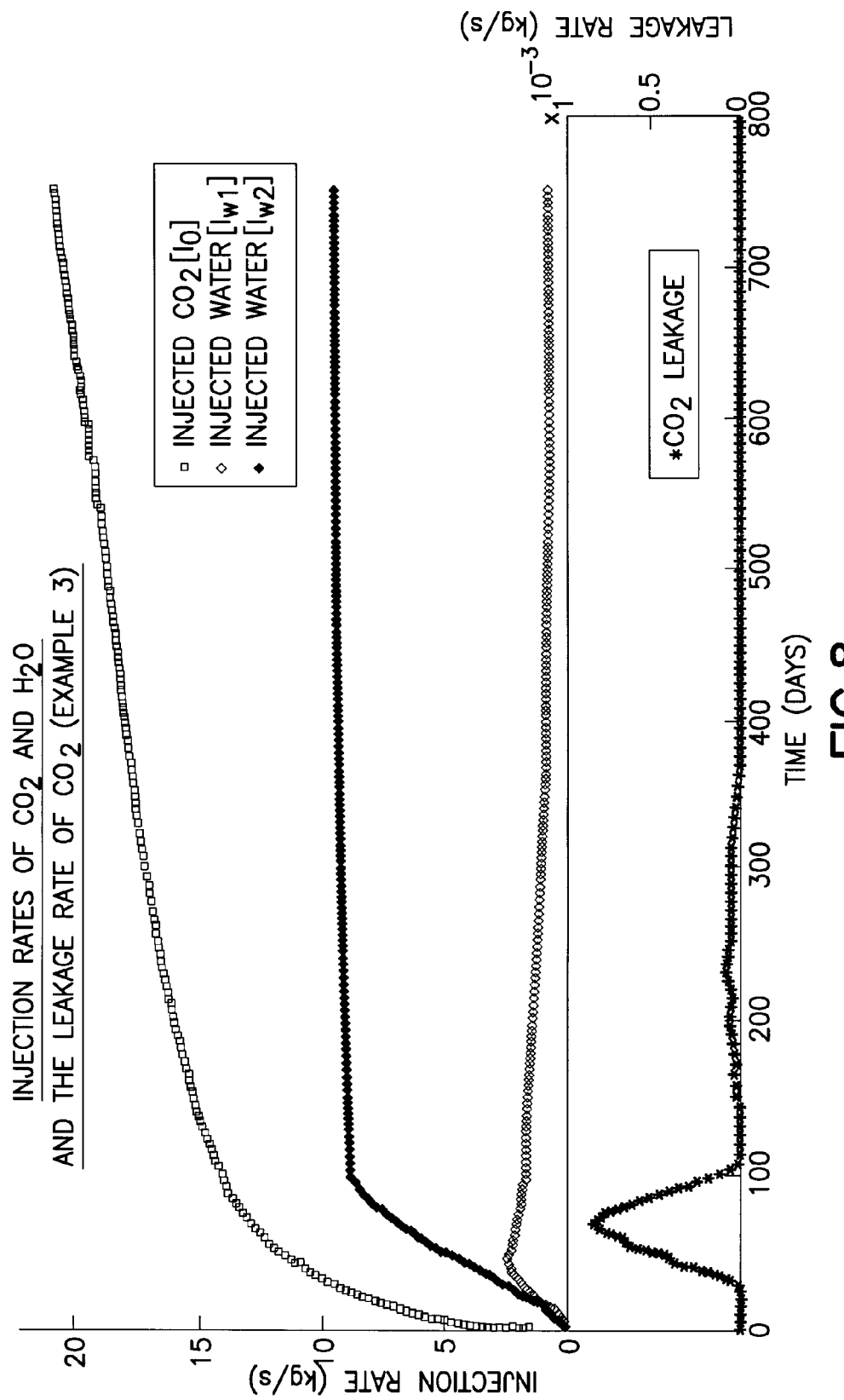
FIG. 8 is a graph of injection rates of carbon dioxide and water(s) and the leakage rate of carbon dioxide over time in the triple-completion system using a feedback control algorithm model.
Figure 9:
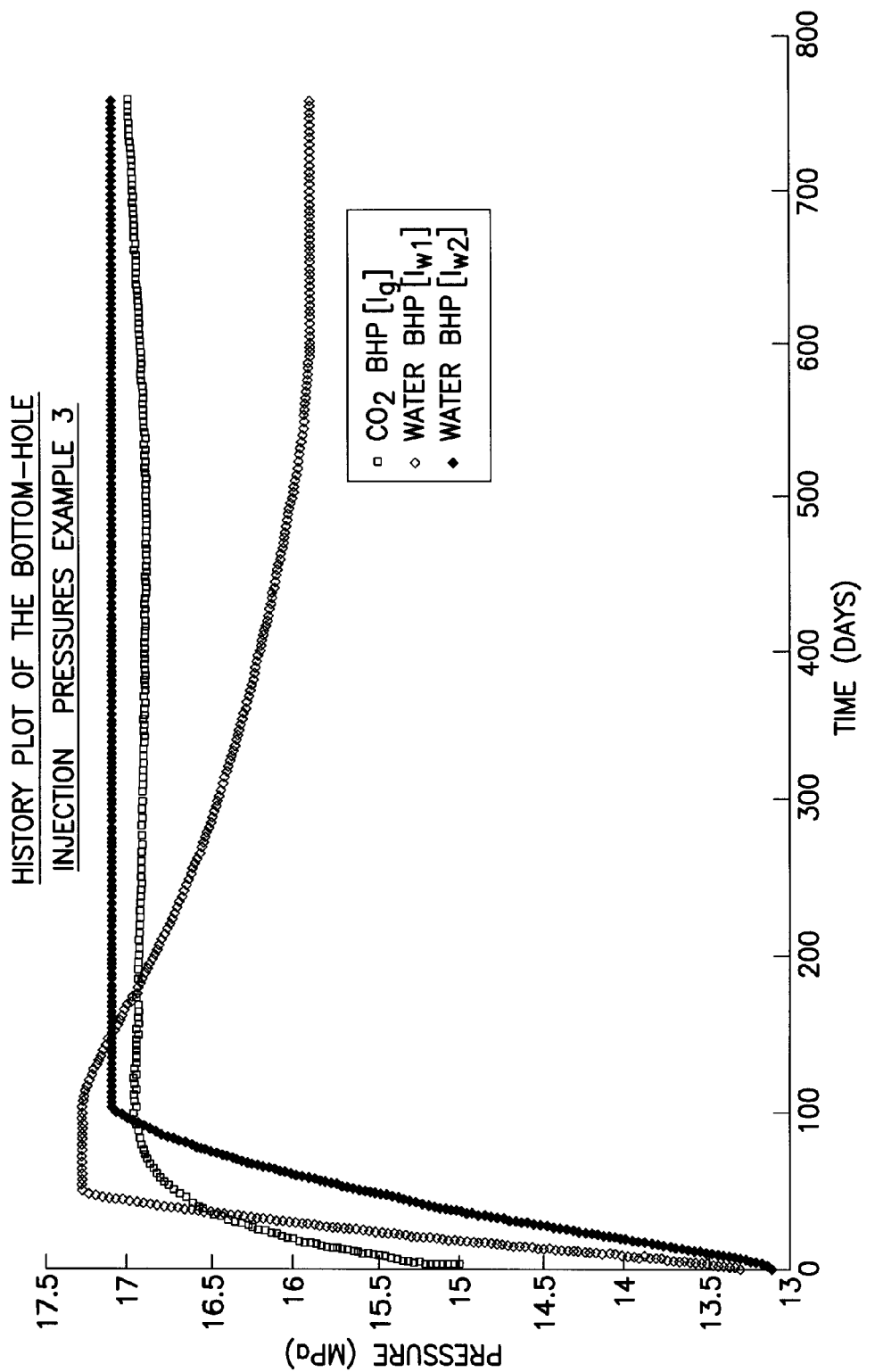
FIG. 9 is a graph of the injection pressures of carbon dioxide and water(s) over time in the triple-completion system using a feedback control algorithm model.
Figure 10:
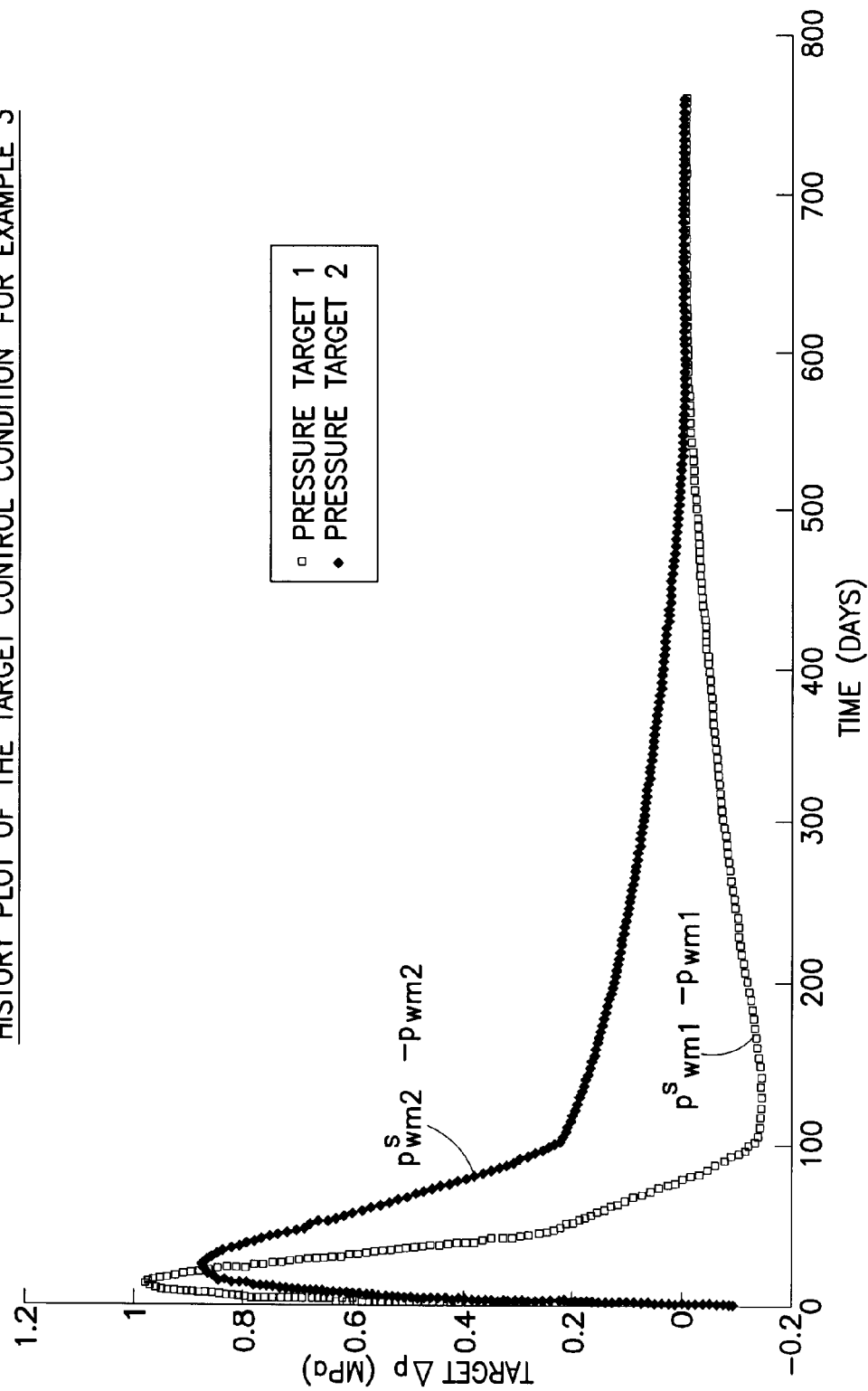
FIG. 10 is a graph of the deviation from the target control pressures for the injection of water into the different intervals of the water-injection layer.

The injection rates of the respective fluids using the dual water injection with a feedback model of Example 3 are shown in FIG. 8, while FIG. 9 shows the corresponding water and $CO_2$ injection pressures. FIG. 8 also shows the leakage rate of $CO_2$. FIG. 10 shows a history of the target control conditions for the two water injection intervals, with curve 1 showing the difference between the set point pressure calculated from equation (7) and the pressure measured by sensor 160b, and curve 2 showing the difference between the set point pressure calculated from equation (8) and the pressure measured by sensor 160a. The values shown in FIG. 10 are used in equations (9)-(13) to control the injection pressures plotted in FIG. 9, which in turn affect the injection rates plotted in FIG. 8.

Review of FIGS. 8-10 raises several points of interest. First, as seen in FIG. 10, it is possible for the actual pressure to exceed the target pressure, and it may take some time for the system to correct for such an overshooting. However, it is important to properly set the control parameters so that correction does not occur too quickly, as the system could become unstable. Second, as seen in FIG. 9, the $CO_2$ injection pressure is progressively increased until the maximum allowed pressure is reached. Because in a finite medium, as a higher mobility fluid displaces a lower mobility fluid (water), injectivity increases slowly, even when the injection pressure of the $CO_2$ reaches a maximum (17 MPa seen in FIG. 9), the injection rate of the $CO_2$ ($I_g$) may continue to increase (as seen in FIG. 8). More particularly, as seen in FIG. 9, the gas pressure starts with a positive slope and builds up towards the maximum allowed injection pressure $p_{gi}{}^M$ (17 MPa in this example). As the gas injection pressure starts to rise, the set points for $p_{wm1}$ and $p_{wm2}$ also rise as seen in the deviation plot of FIG. 10. Consequently, the water injection pressures increase. At some stage, the actual pressures reach maximum allowed values reflected by the flattening of the curves in FIG. 9. Kinks or discontinuities in the delta pressure (deviation) target curves of FIG. 10 indicate the same.

Once the maximum water injection pressures are reached and maintained, the gas pressure is forced to decrease (as seen in FIG. 9). In the example, as determined by the control constants, the decline rate is small. This allows $p_{wm2}$ to meet its set point (by reducing the set point value) and drive the target difference to zero. Simultaneously, the injection pressure in $I_{w1}$ decreases so that the set point of $p_{wm1}$ may be reached. Ultimately, the target differences go to zero (as seen in FIG. 10) and the injection pressures are maintained at nearly constant values (as seen in FIG. 9). Such an ideal response behavior requires fine-tuning the control constants. The injection rates seen in FIG. 8 are a direct consequence of the feedback control of injection pressures aimed at reaching the set-points.

From the above results of it can be concluded that the controlled multizonal injection technique (Example 3) allows the leakage rates to be reduced further and more efficiently than the dual injection technique (Examples 1 and 2), while keeping the water injection requirements at a minimum.

There have been described and illustrated herein several embodiments of a system and a method of sequestering carbon dioxide in a formation. While particular embodiments of the invention have been described, it is not intended that the invention be limited thereto, as it is intended that the invention be as broad in scope as the art will allow and that the specification be read likewise. Thus, while particular simulation tools have been disclosed for the purpose of determining an optimal perforation length with respect to preventing carbon dioxide leakage while minimizing water usage, it will be appreciated that other simulation tools could be used as well. Likewise, while certain values for certain parameters and coefficients have been suggested, it will be appreciated that other values could be utilized. Further, while the embodiments were described as being a "dual completion" or a "triple completion" or a "multiple" completion, it will be appreciated that more than three completions could be modeled and utilized. In addition, while a feedback control algorithm for determining injection pressures has been described as utilizing measurements of a sensor in the $CO_2$ injection layer, and two sensors in the water injection layer, it will be appreciated that different algorithms could be utilized. For example, the initial $CO_2$ injection pressure could be set at a maximum and maintained there while the water injection pressures are varied to accommodate such an arrangement. It will therefore be appreciated by those skilled in the art that yet other modifications could be made to the provided invention without deviating from its spirit and scope as claimed.

What is claimed is:

1. A method for sequestration of carbon dioxide in a formation traversed by a cased wellbore, comprising:
   a) finding a location in the formation having a first permeable layer directly overlain by a nearly impermeable layer, which in turn is overlain by a second permeable layer;
   b) running simulations of the formation assuming injection of carbon dioxide into the first permeable layer and injection of water along at least one length in said second permeable layer in order to find at least one length which provides desired results concerning leakage of carbon dioxide from the first permeable layer;
   c) completing the wellbore with at least two completions and with first perforations in the casing along said first permeable layer for the purpose of injecting carbon dioxide into the first permeable layer and with at least one set of second perforations in the casing along said at least one length which provides desired results for the purpose of injecting water into the second permeable layer; and
   d) injecting carbon dioxide and water into their respective layers simultaneously, with the nearly impermeable layer therebetween, where the water is injected at a pressure at least equal to the carbon dioxide injection pressure plus a gravitational head correction for the water and carbon dioxide minus an entry capillary pressure of the nearly impermeable layer.

2. A method according to claim 1, wherein:
said at least two completions comprises at least three completions, and said at least one set of second perforations in the casing along said at least one length comprises at least a first set and a second set of second perforations.

3. A method according to claim 2, further comprising:
locating a first pressure sensor along said formation which senses pressure in said first permeable layer;
locating a second pressure sensor along said formation which senses pressure at a first location in said second permeable layer; and
locating a third pressure sensor along said formation which senses pressure at a second location in said second permeable layer.

4. A method according to claim 3, wherein:
said first pressure sensor is located along said first permeable layer adjacent said impermeable layer, and
said second pressure sensor is located along said second permeable layer adjacent said impermeable layer.

5. A method according to claim 4, wherein:
said third pressure sensor is located along said second permeable layer distant said impermeable layer.

6. A method according to claim 3, further comprising:
using a feedback control algorithm which utilizes readings of said first pressure sensor, said second pressure sensor, and said third pressure sensor, controlling and changing over time a first water injection pressure at which water is injected into said second permeable layer through said two sets of second perforations.

7. A method according to claim 1, further comprising:
locating a first pressure sensor in said formation which senses pressure in said first permeable layer;
locating a second pressure sensor in said formation which senses pressure at a first location in said second permeable layer;
locating a third pressure sensor in said formation which senses pressure at a second location in said second permeable layer; and
using a feedback control algorithm which utilizes readings of said first pressure sensor, said second pressure sensor, and said third pressure sensor, controlling and changing over time a first water injection pressure at which water is injected into said second permeable layer through said at least one set of second perforations.

8. A method according to claim 7, wherein:
said controlling and changing over time is controlled and changed according to $$\frac{d p_{wi}}{dt} = \kappa_w |p_{wm}^s - p_{wm}|^{\upsilon_w} \operatorname{sgn}(p_{wm}^s - p_{wm})[1 - H(p_{wi} - p_{wi}^M)H(p_{wm}^s - p_{wm})]$$

where $p_{wi}$ is said first water injection pressure, $p_{wm}$ is a water interval measured pressure obtained from said second pressure sensor and said third pressure sensor, $p_{wm}^s$ is a set point for the water interval measured pressure, $\kappa_w$ is a control parameter, $\upsilon_w$ is a sensitivity exponent, sgn indicates the sign function, H is a function such that H(x)=1 when x≧0 and zero otherwise, and $p_{wi}^M$, is a maximum injection pressure.

9. A method according to claim 8, wherein:
said feedback control algorithm controls and changes over time a carbon dioxide injection pressure at which the carbon dioxide is injected into said first permeable layer through said first set of perforations.

10. A method according to claim 8, wherein:
said feedback control algorithm controls and changes over time said carbon dioxide injection pressure according to $$\frac{dp_{gi}}{dt} = \kappa_{g0}|p_{gi}^M - p_{gi}|^{\upsilon_{g0}} \text{sgn}(p_{gi}^M - p_{gi})H(p_{wi}^{M_\varepsilon} - p_{wi}) - [\kappa_{g1}|p_{wm} - p_{wm1}^s|^{\upsilon_{g1}} H(p_{wm}^s - p_{wm})] \times [1 - H(p_{wi}^{M_\varepsilon} - p_{wi})]$$

where $p_{gi}$ is said carbon dioxide injection pressure, $p_{gi}^M$ is a maximum carbon dioxide injection pressure, $p_{gi}^{M_\varepsilon}$ is a carbon dioxide injection pressure slightly below said maximum carbon dioxide injection pressure, $\kappa_{g0}$ and $\kappa_{g1}$ are nonnegative control coefficients, and $\upsilon_{g0}$ and $\upsilon_{g1}$ are sensitivity exponents.

11. A method according to claim 7, wherein:
said at least two completions comprises at least three completions, and said at least one set of second perforations in the casing along said at least one length comprises at least a first set and a second set of second perforations, and said feedback control algorithm controls and changes over time said first water injection pressure at which water is injected through said first set of second perforations and a second water injection pressure at which water is injected into said second permeable layer through said second set of second perforations.

12. A method according to claim 11, wherein:
said feedback control algorithm controls and changes over time said first water injection pressure at which water is injected through said first set of second perforations and a second water injection pressure at which water is injected into said second permeable layer through second set of second perforations according to $$\frac{dp_{wi1}}{dt} = [\kappa_{11}|p_{wm1}^s - p_{wm1}|^{\upsilon_{w11}} \text{sgn}(p_{wm1}^s - p_{wm1}) + \kappa_{12}|p_{wm2}^s - p_{wm2}|^{\upsilon_{w12}} \text{sgn}(p_{wm2}^s - p_{wm2})][1 - H(p_{wi1} - p_{wi1}^M)H(A_1)]$$

where $$A_1 = [\kappa_{11}|p_{wm1}^s - p_{wm1}|^{\upsilon_{w11}} \text{sgn}(p_{wm1}^s - p_{wm1}) + \kappa_{12}|p_{wm2}^s - p_{wm2}|^{\upsilon_{w12}} \text{sgn}(p_{wm2}^s - p_{wm2})]$$

and $$\frac{dp_{wi2}}{dt} = [\kappa_{21}|p_{wm1}^s - p_{wm1}|^{\upsilon_{w21}} \text{sgn}(p_{wm1}^s - p_{wm1}) + \kappa_{22}|p_{wm2}^s - p_{wm2}|^{\upsilon_{w22}} \text{sgn}(p_{wm2}^s - p_{wm2})][1 - H(p_{wi2} - p_{wi2}^M)H(A_2)]$$

with $$A_2 = [\kappa_{21}|p_{wm1}^s - p_{wm1}|^{\upsilon_{w21}} \text{sgn}(p_{wm1}^s - p_{wm1}) + \kappa_{22}|p_{wm2}^s - p_{wm2}|^{\upsilon_{w22}} \text{sgn}(p_{wm2}^s - p_{wm2})],$$

where $p_{wi1}$ is said first water injection pressure, $p_{wi2}$ is said second water injection pressure, $p_{wm1}$ is a measured water pressure obtained from said second pressure sensor, $p_{wm2}$ is a measured water pressure obtained from and said third pressure sensor, $p_{wm1}^s$ is a set point for the first water pressure, $p_{wm2}^s$ is a set point for the second water pressure, $p_{wi1}^M$ is a maximum first water injection pressure, $p_{wi2}^M$ is a maximum second water injection pressure, $\kappa_{11}$, $\kappa_{12}$, $\kappa_{21}$, and $\kappa_{22}$ are a first set of nonnegative control coefficients, $\upsilon_{w11}$, $\upsilon_{w12}$, $\upsilon_{w21}$, and $\upsilon_{w22}$ are a first set of sensitivity exponents, sgn indicates the sign function, and H is a function such that H(x)=1 when x≧0 and zero otherwise.

13. A method according to claim 11, wherein:
said feedback control algorithm controls and changes over time a carbon dioxide injection pressure at which the carbon dioxide is injected into said first permeable layer through said first set of perforations.

14. A method according to claim 12, wherein:
said feedback control algorithm controls and changes over time a carbon dioxide injection pressure at which the carbon dioxide is injected into said first permeable layer through said first set of perforations according to $$\frac{dp_{gi}}{dt} = \kappa_{g0}|p_{gi}^M - p_{gi}|^{\upsilon_{g0}} \text{sgn}(p_{gi}^M - p_{gi})H(p_{wi2}^{M_\varepsilon} - p_{wi2})$$
$$H(p_{wi1}^{M_\varepsilon} - p_{wi1}) - [\kappa_{g1}|p_{wm1} - p_{wm1}^s|^{\upsilon_{g1}} H(p_{wm1}^s - p_{wm1}) + \kappa_{g2}|p_{wm2}^s - p_{wm2}|^{\upsilon_{g2}} H(p_{wm2}^s - p_{wm2})] \times$$
$$[1 - H(p_{wi2}^{M_\varepsilon} - p_{wi2})H(p_{wi1}^{M_\varepsilon} - p_{wi1})]$$

where $p_{gi}$ is said carbon dioxide injection pressure, $p_{gi}^M$ is a maximum gas injection pressure, $p_{wi1}^{M_\varepsilon}$ is a first water injection pressure slightly below said maximum first water injection pressure, $p_{wi2}^{M_\varepsilon}$ is a second water injection pressure slightly below said maximum second water injection pressure, $\upsilon_{g0}$, $\upsilon_{g1}$, and $\upsilon_{g2}$ are a second set of nonnegative control coefficients, and $\upsilon_{g0}$, $\upsilon_{g1}$ and $\upsilon_{g2}$ are a second set of sensitivity exponents.

15. A method according to claim 14, wherein:
said first set of sensitivity components and said second set of sensitivity components are set to one.

16. A method according to claim 12, wherein:
said first water injection pressure at which water is injected through said first set of second perforations is driven by a target pressure of $p_{wm1}^s = p_{gm0} - \rho^g g(z_0 - z_{m0}) + \rho_w g(z_0 - z_{m1}) - (1-\alpha_1)p_b$ where $p_{wm1}^s$ is a target measurement pressure of said second pressure sensor, $p_b$ is the entry capillary pressure, $\alpha_1$ is a first safety factor which is less than unity but greater than zero, g is the gravity constant, $\rho_g$ and $\rho_w$ are the densities of the injected carbon dioxide and the injected water respectively, $z_0$, $z_{m0}$ and $z_{m1}$ are respectively an interface location between the first permeable layer and the first nearly impermeable layer, a pressure measurement location for said first permeable layer, and a first pressure measurement location for said second permeable layer, and $p_{gm0}$ is the pressure measured by said first pressure sensor.

17. A method according to claim 16, wherein:
said second water injection pressure at which water is injected into said second permeable layer through said second set of second perforations is driven by a target pressure of $p_{wm2}^s = p_{gm0}^* - \rho_g g(z_0 - z_{m0}) + \rho_w g(z_0 - z_{m2}) - (1-\alpha_2)p_b$ where $p_{wm2}^s$ is a target measurement pressure of said third pressure sensor, $\alpha_2$ is a second safety factor which is less than unity but greater than zero, and $p_{gm0}^*$ is an estimated pressure which would be measured by said first pressure sensor at a radius of investigation.

18. A method for sequestration of carbon dioxide in a formation having a first permeable layer directly overlain by a nearly impermeable layer, which in turn is overlain by a second permeable layer, the formation being traversed by a cased wellbore, comprising:
a) completing the wellbore with at least three completions, with first perforations in the casing along said first permeable layer for the purpose of injecting carbon dioxide into the first permeable layer and with at least two sets of second perforations in the casing along said second permeable layer for the purpose of injecting water into the second permeable layer, and with a first pressure sensor along said formation which senses pressure in said first permeable layer, a second pressure sensor along said formation which senses pressure at a first location in said second permeable layer, and a third pressure sensor along said formation which senses pressure at a second location in said second permeable layer; and b) simultaneously injecting carbon dioxide into said first permeable layer through said first perforations and water into said second permeable layer separately through said at least two sets of second perforations, where the carbon dioxide and water is injected using a feedback control algorithm which utilizes readings of said first pressure sensor, said second pressure sensor, and said third pressure sensor, and controls and changes over time a carbon dioxide injection pressure, and both first and second water injection pressures at which water is injected into said second permeable layer.

19. A method according to claim 18, wherein:
said first pressure sensor is located just below said nearly impermeable layer, said second pressure sensor is located just above said nearly impermeable layer, and said feedback control algorithm minimizes a pressure difference between water and carbon dioxide across said nearly impermeable layer corrected by a fraction of an entry capillary pressure into said nearly impermeable layer and for gravity.

20. A method according to claim 19, wherein:
said third pressure sensor is located at a top of said second permeable layer.

21. A system for sequestration of carbon dioxide in a formation having a surface and thereunder a first permeable layer directly overlain by a nearly impermeable layer, which in turn is overlain by a second permeable layer, the formation being traversed by a cased wellbore, comprising:
a) a first pump coupled to a source of carbon dioxide;
b) second and third pumps coupled to at least one source of water;
c) a triple completion of the cased wellbore, said triple completion coupled to said first pump, said second pump, and said third pump and providing independent communication between the surface and the first permeable layer and between the surface and a first location in said second permeable layer and between the surface and a second location in said second permeable layer, wherein said first pump pumps the supercritical carbon dioxide down the third completion and into the first permeable layer at a first injection pressure, and simultaneously the second pump pumps water down the triple completion and into a first location in the second permeable layer at a second injection pressure, said second injection pressure at least equal to said first injection pressure plus a gravitational head correction minus an entry capillary pressure correction for the water, and simultaneously the third pump pumps water down the triple completion and into a second location in the second permeable layer at a third injection pressure.

22. A system according to claim 21, further comprising:
a first pressure sensor located along said formation which senses pressure in said first permeable layer;
a second pressure sensor located along said formation which senses pressure at a first location in said second permeable layer;
a third pressure sensor located along said formation which senses pressure at a second location in said second permeable layer; and
a feedback control system coupled to said first pressure sensor, said second pressure sensor, said third pressure sensor, and said first pump, said second pump, and said third pump, wherein said feedback control system utilizes readings of said first pressure sensor, said second pressure sensor, and said third pressure sensor, and controls and changes over time a carbon dioxide injection pressure applied by said first pump, and first and second water injection pressures at which water is injected into said second permeable layer by said second and third pumps.

* * * * *